March 11, 1941. W. REINERS ET AL 2,234,355
COP WINDING MECHANISM
Filed March 27, 1936 21 Sheets-Sheet 1

Inventors:
W. Reiners and G. Kahlisch
by Knight Bros.
Attorneys

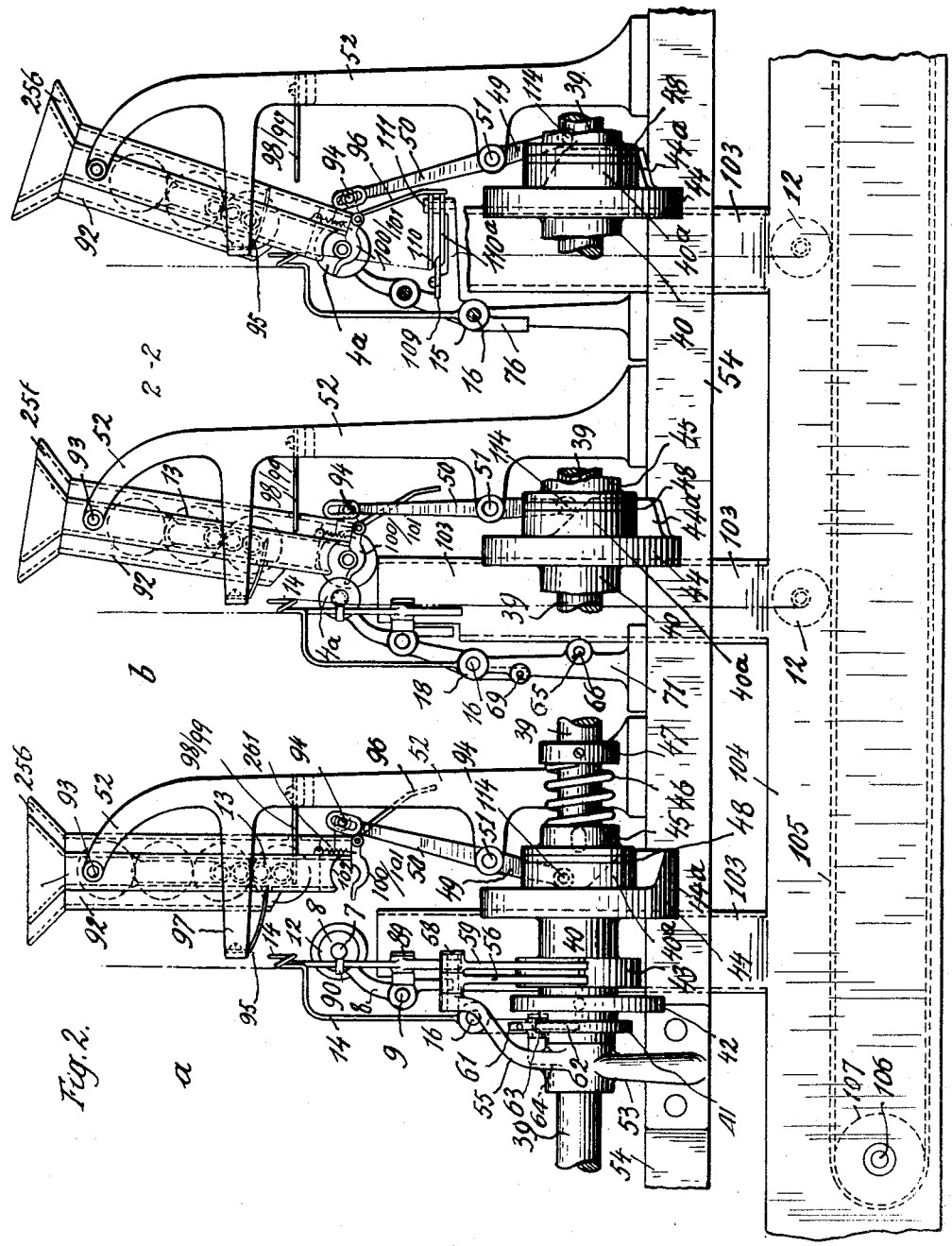

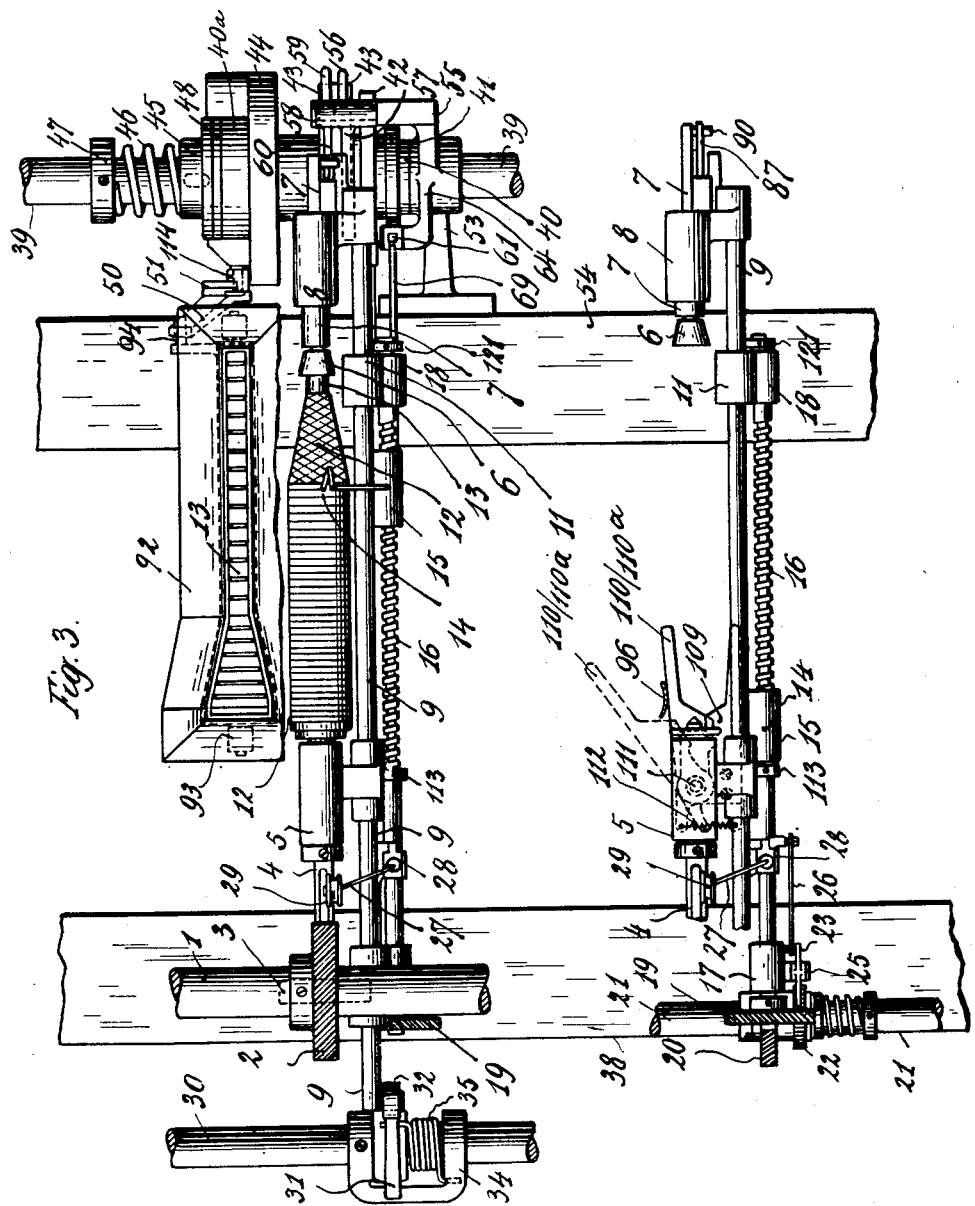

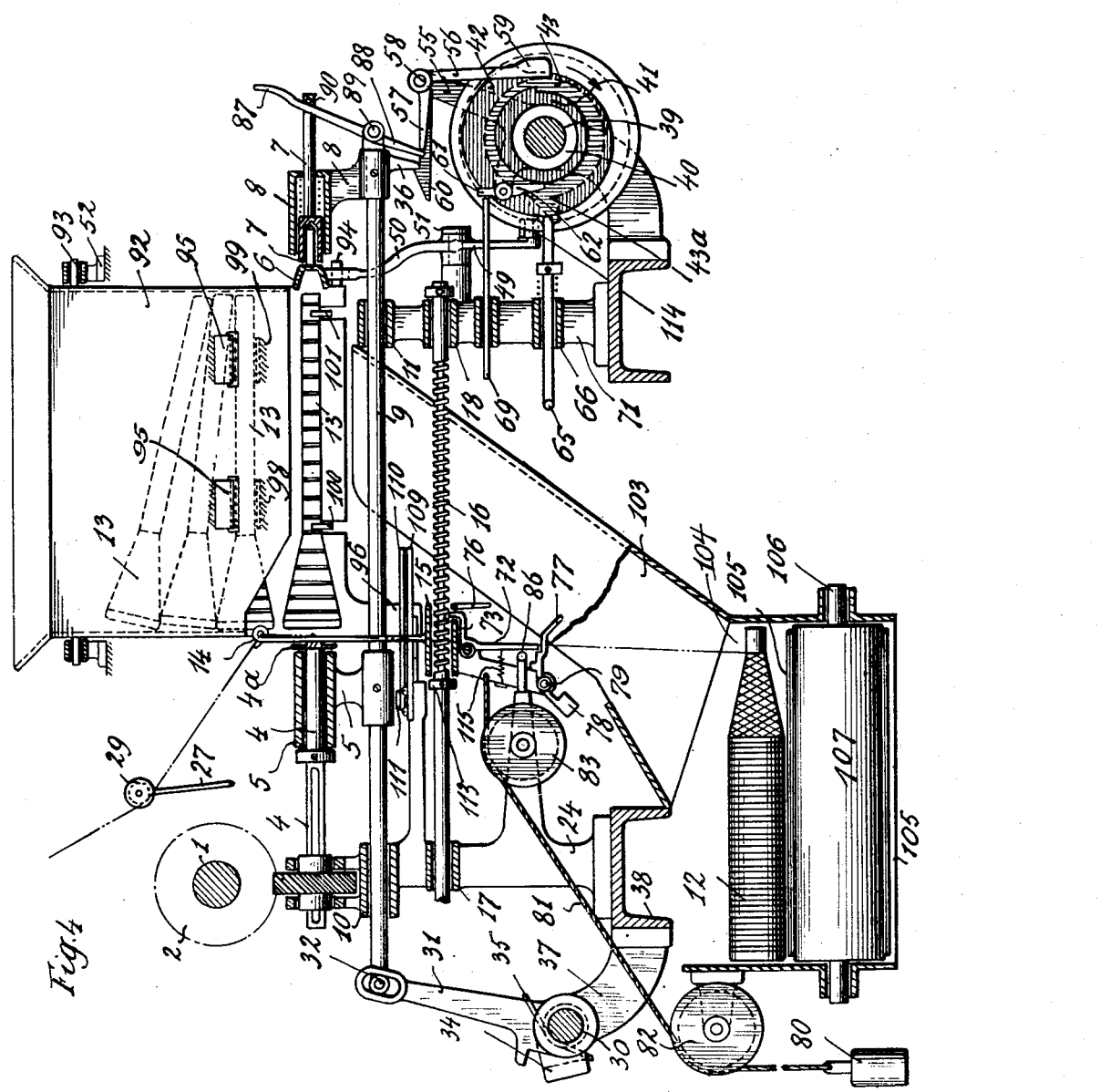

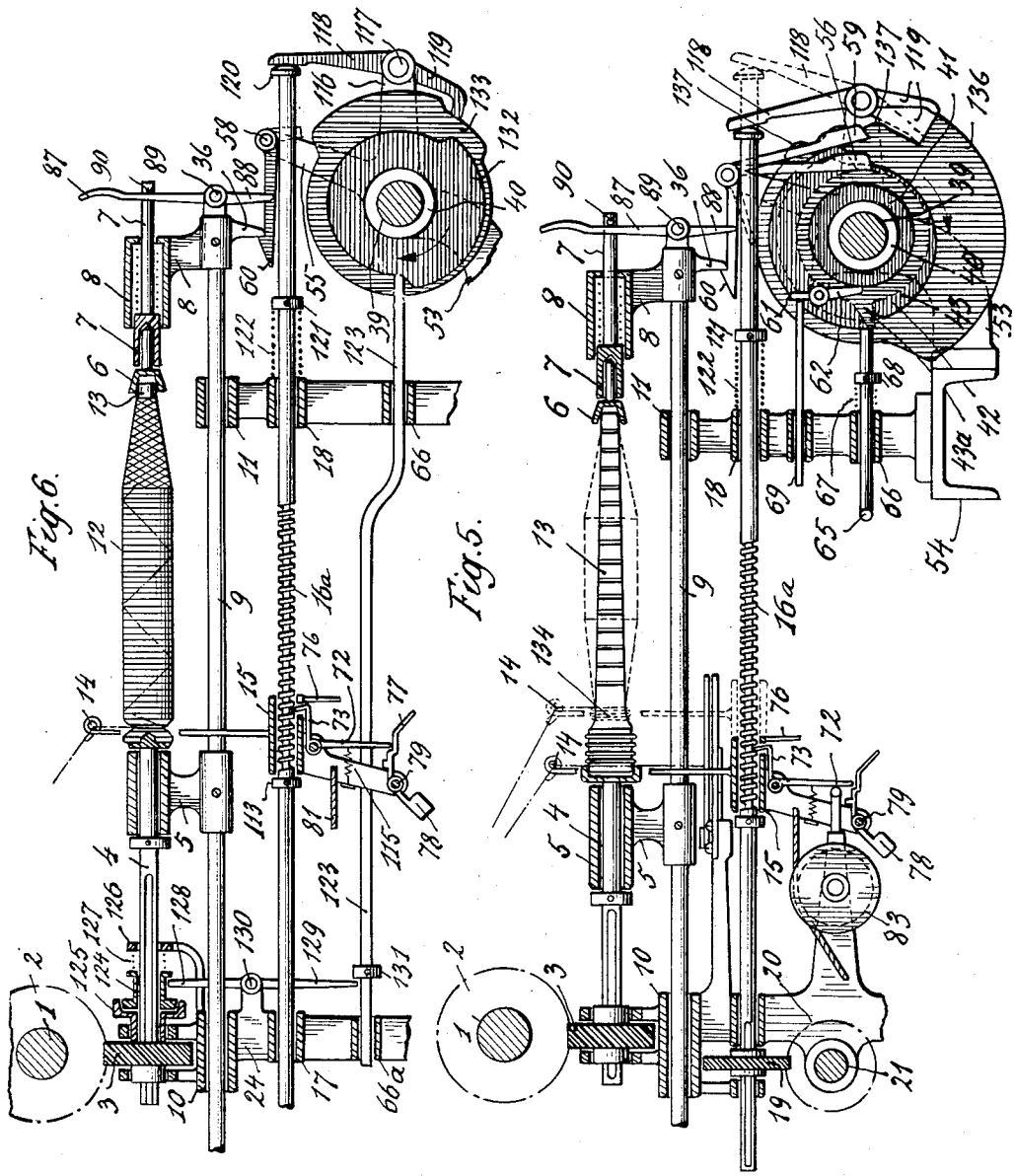

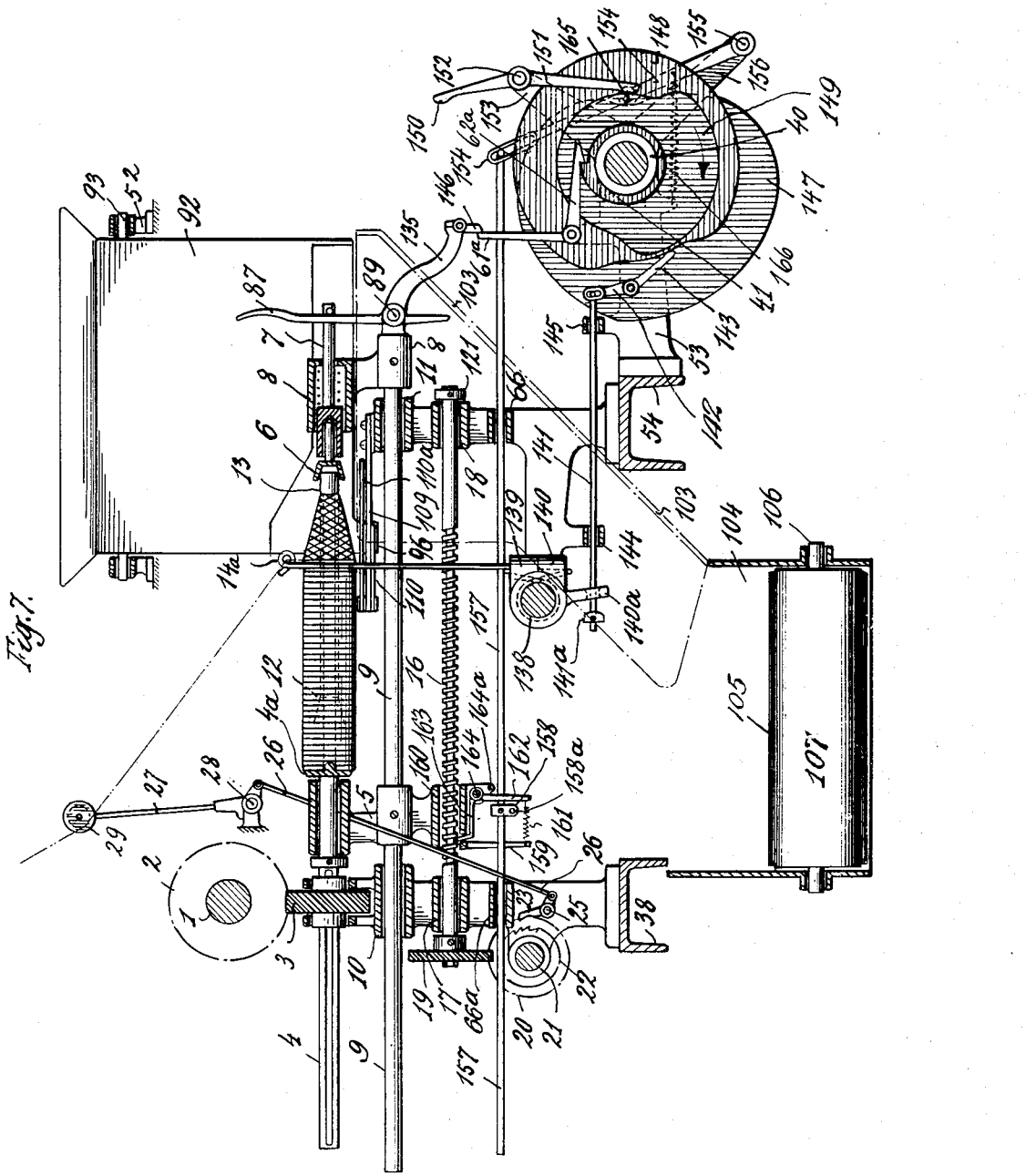

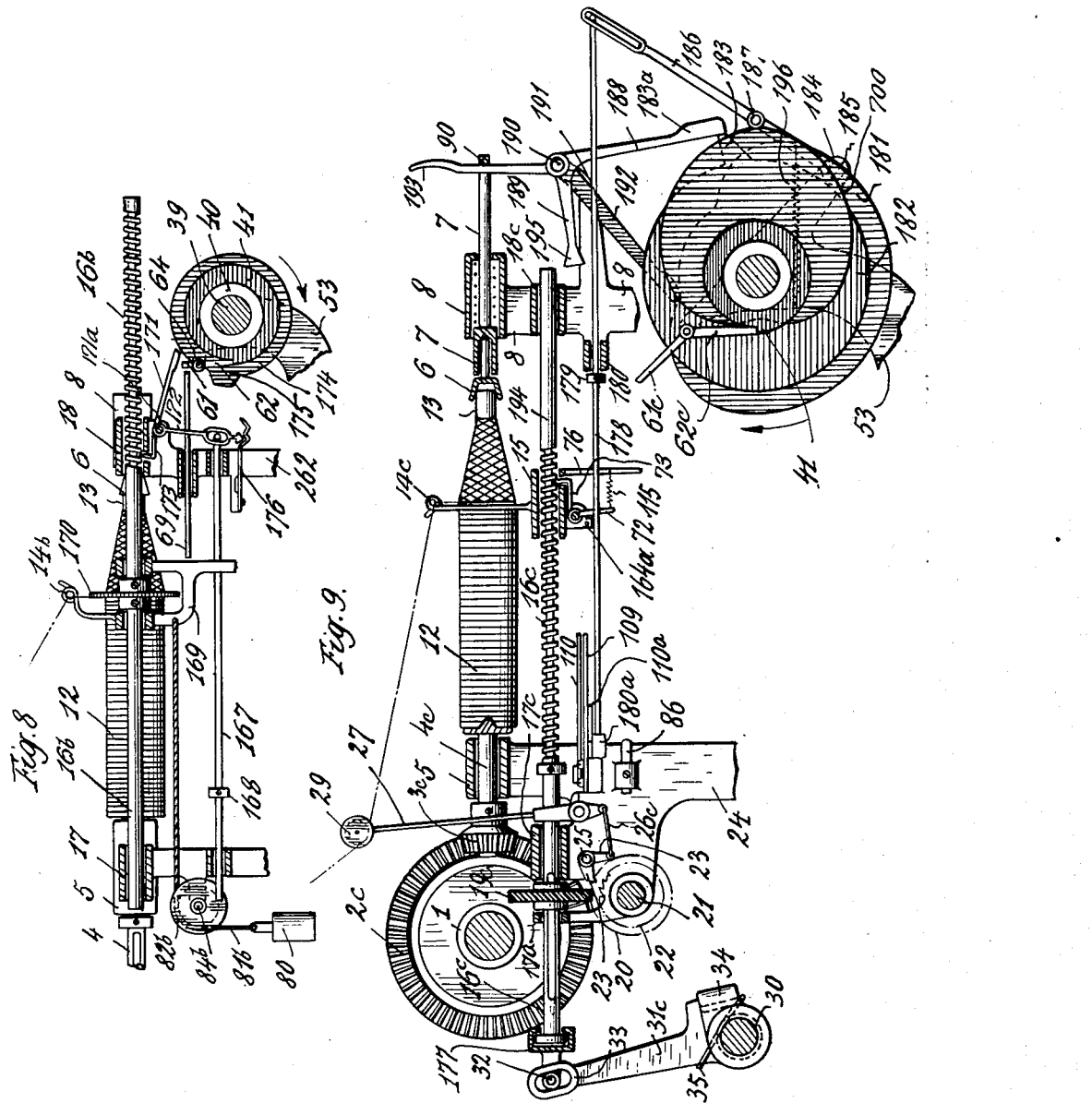

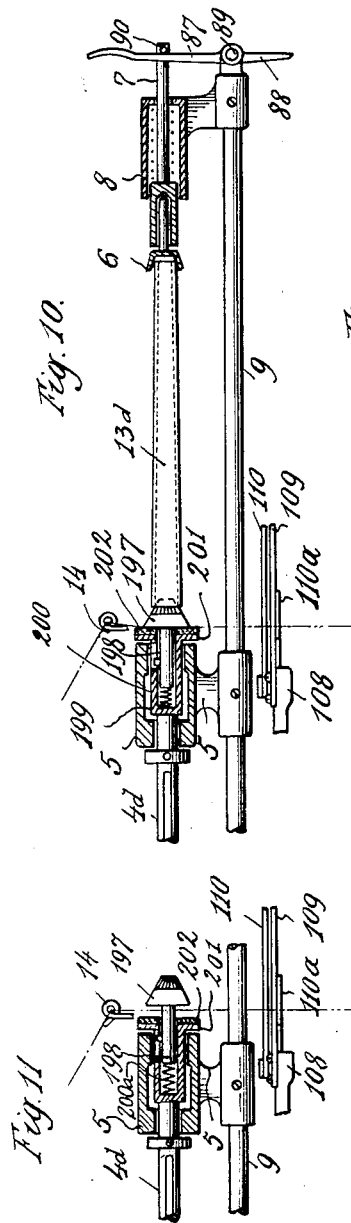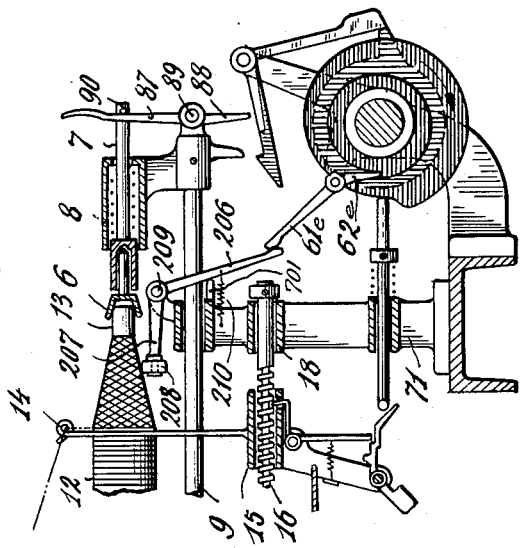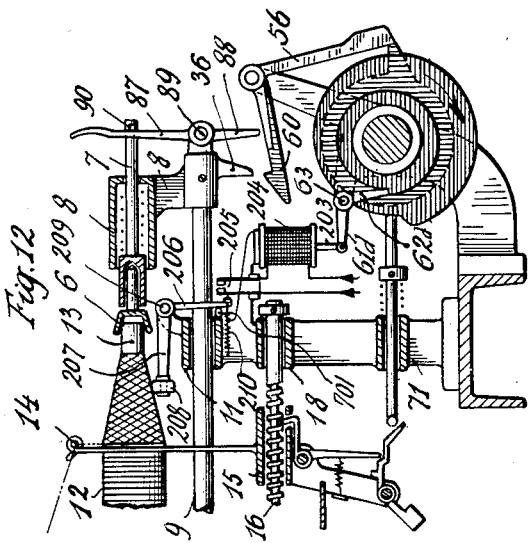

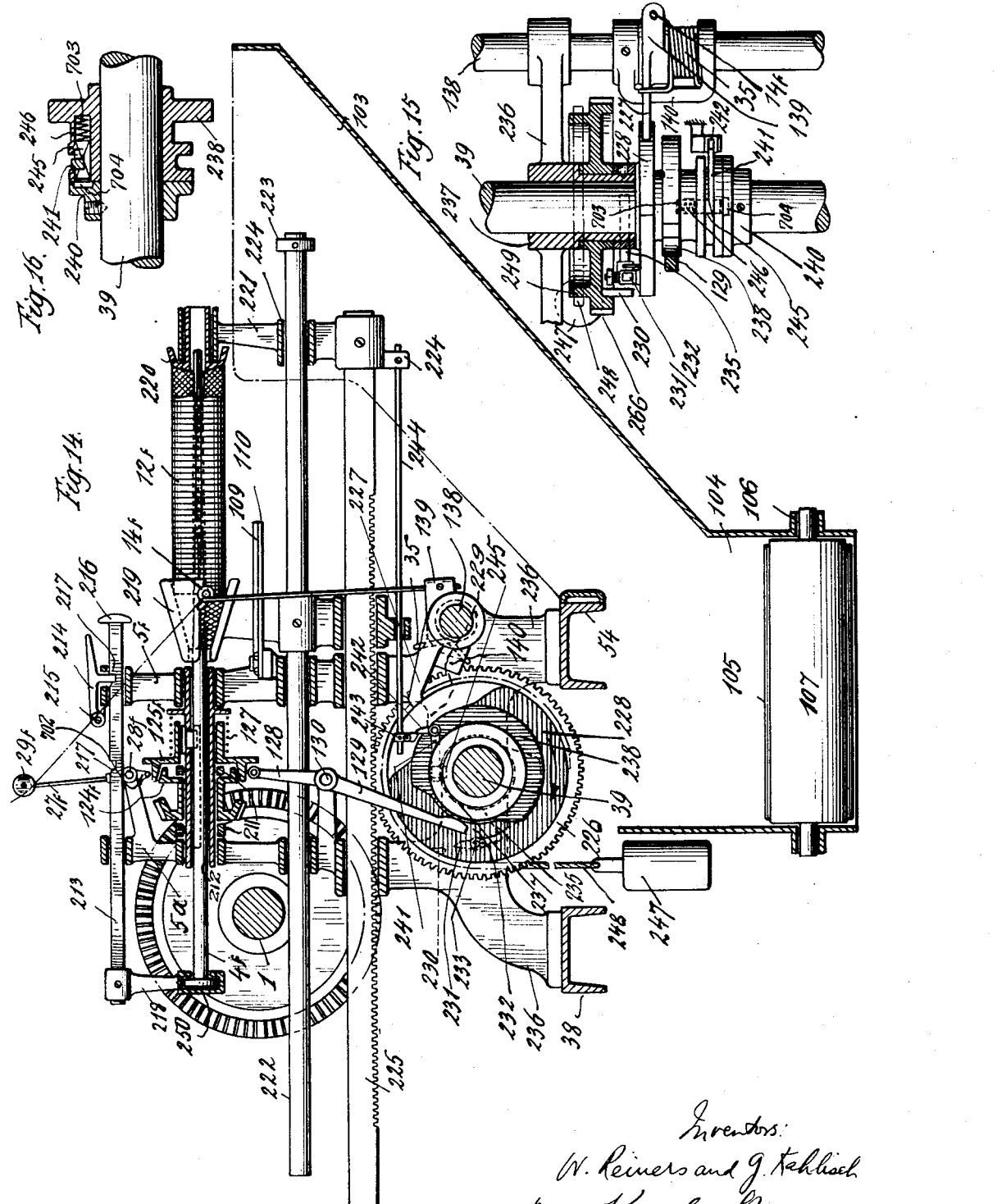

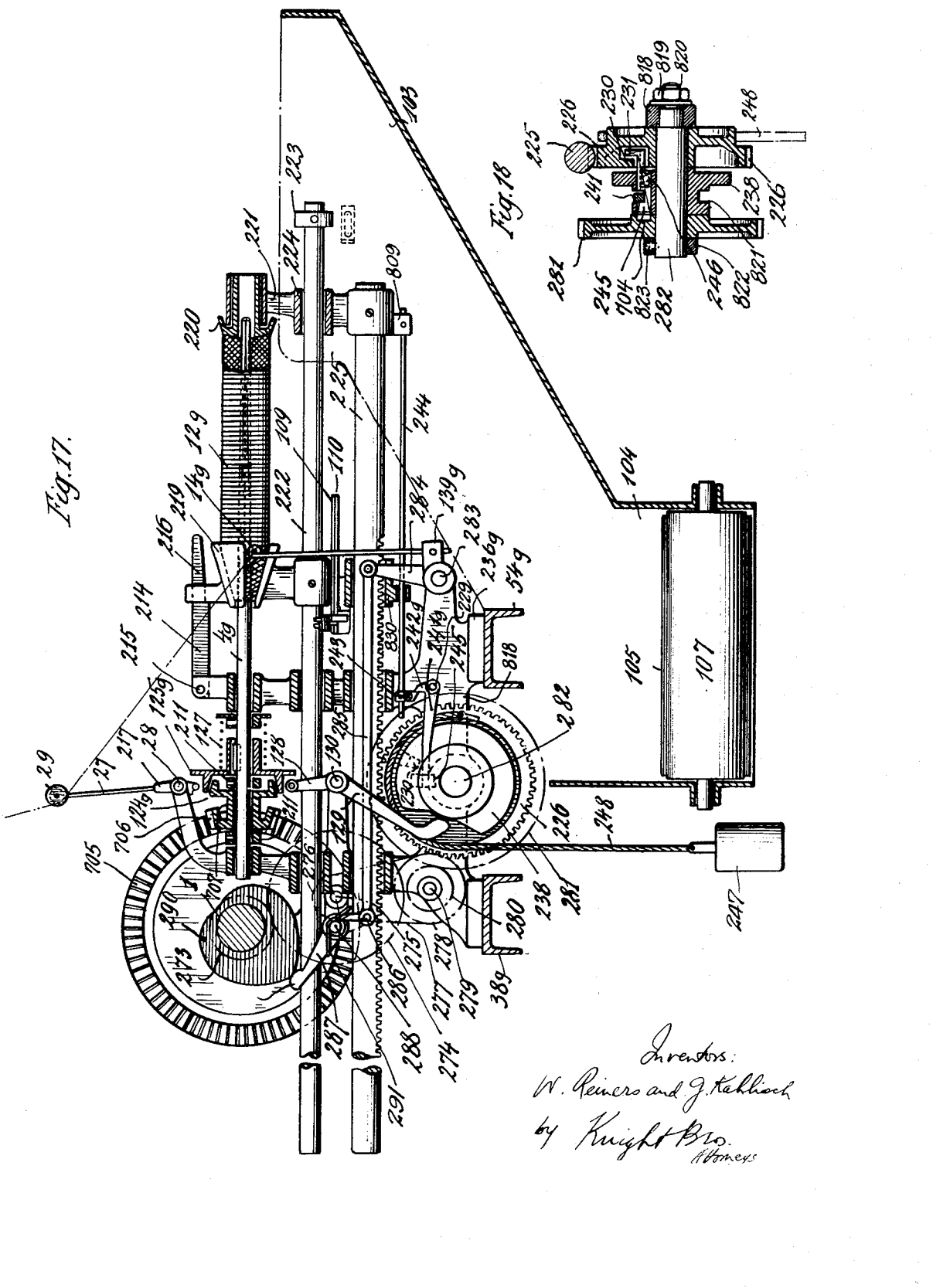

March 11, 1941.   W. REINERS ET AL   2,234,355
COP WINDING MECHANISM
Filed March 27, 1936   21 Sheets-Sheet 11

March 11, 1941.  W. REINERS ET AL  2,234,355
COP WINDING MECHANISM
Filed March 27, 1936  21 Sheets-Sheet 12
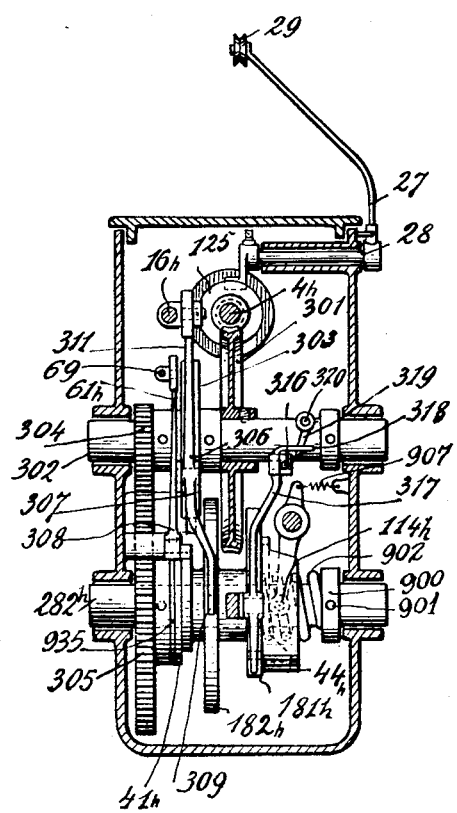
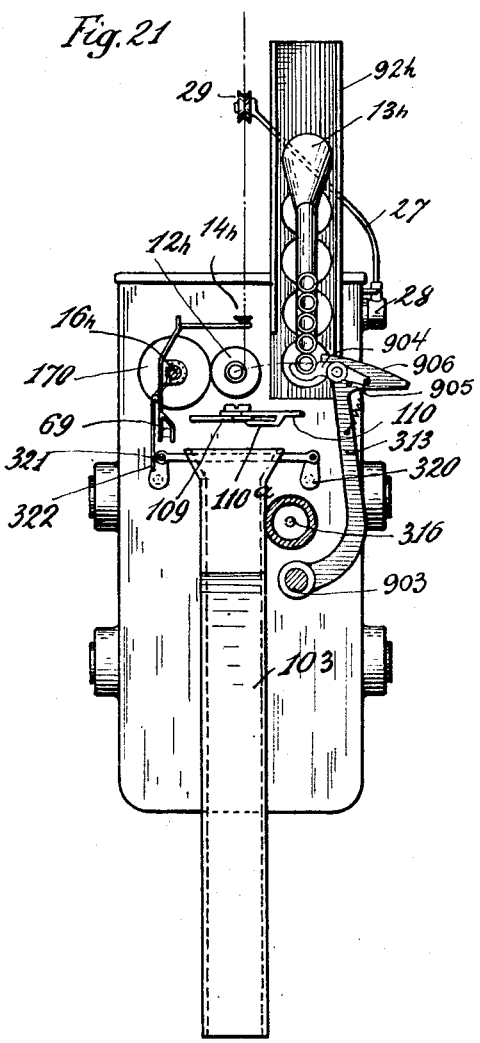

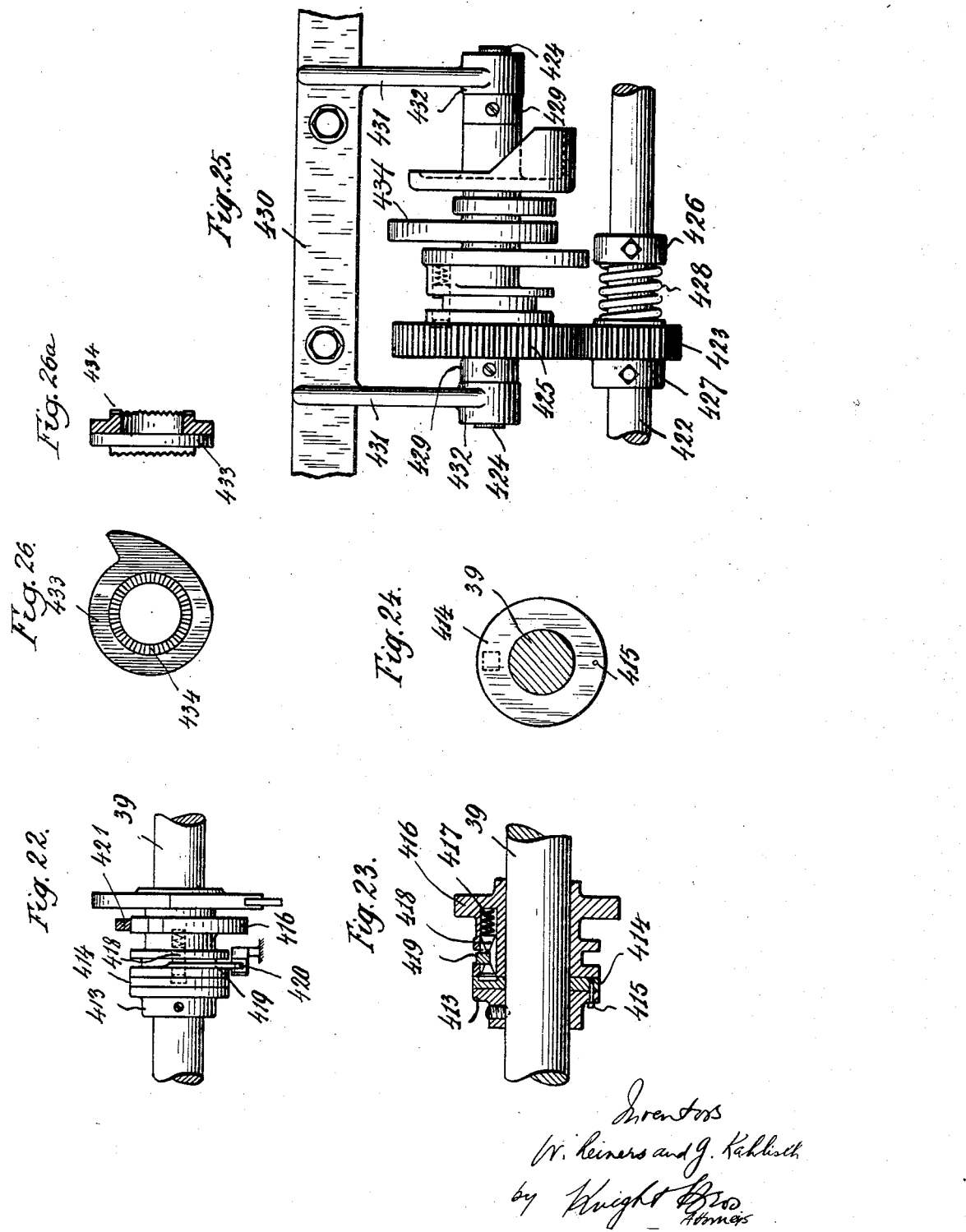

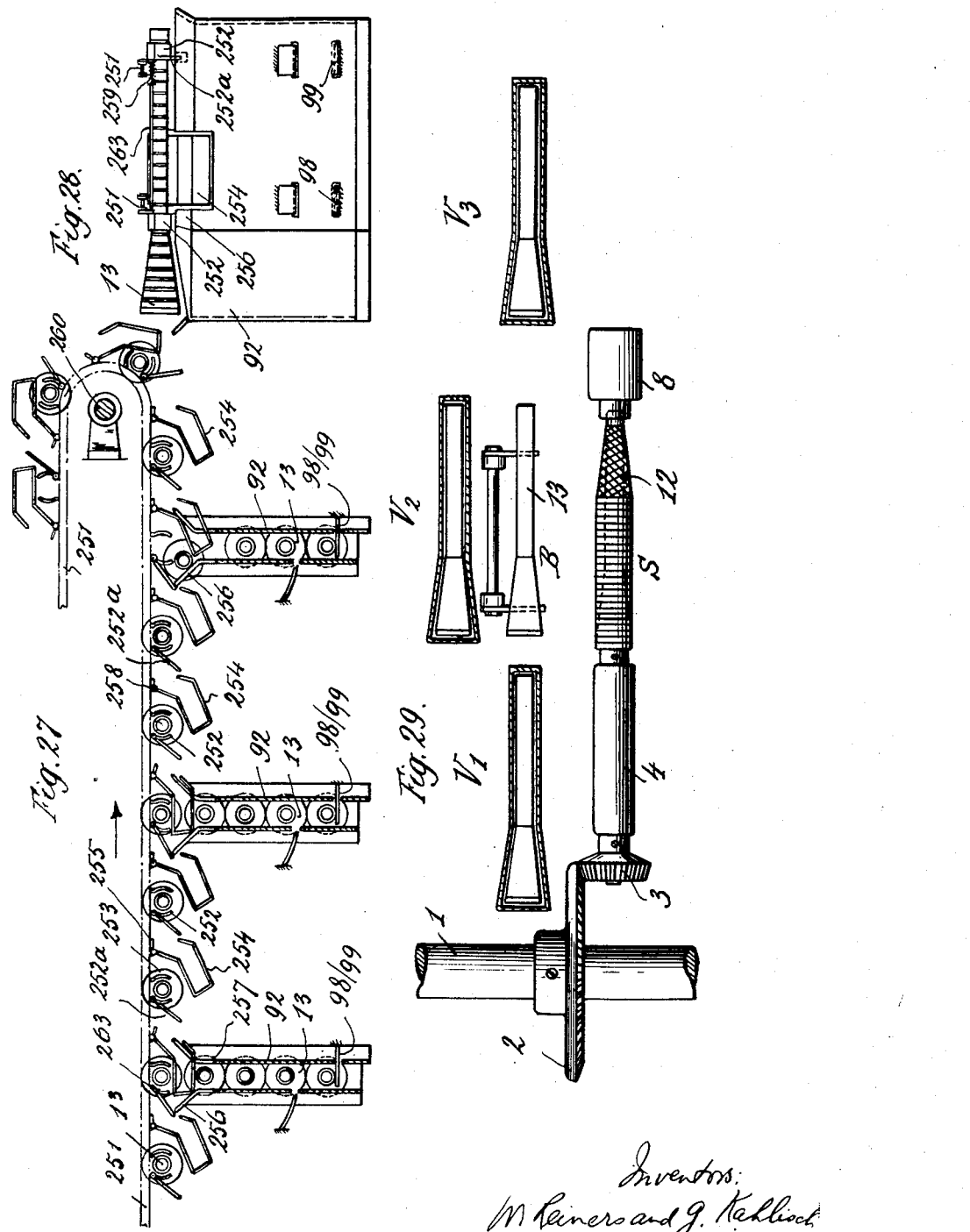

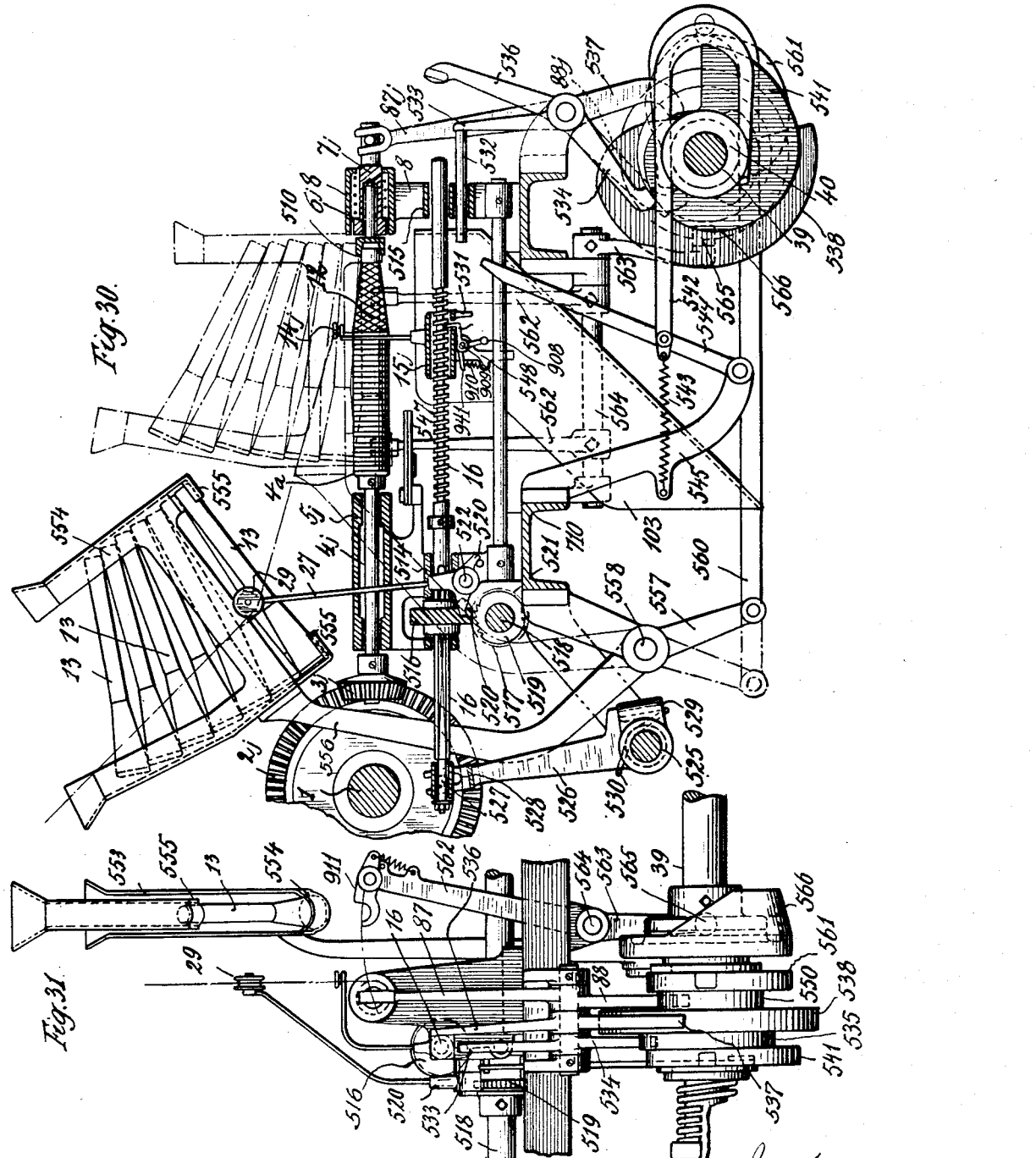

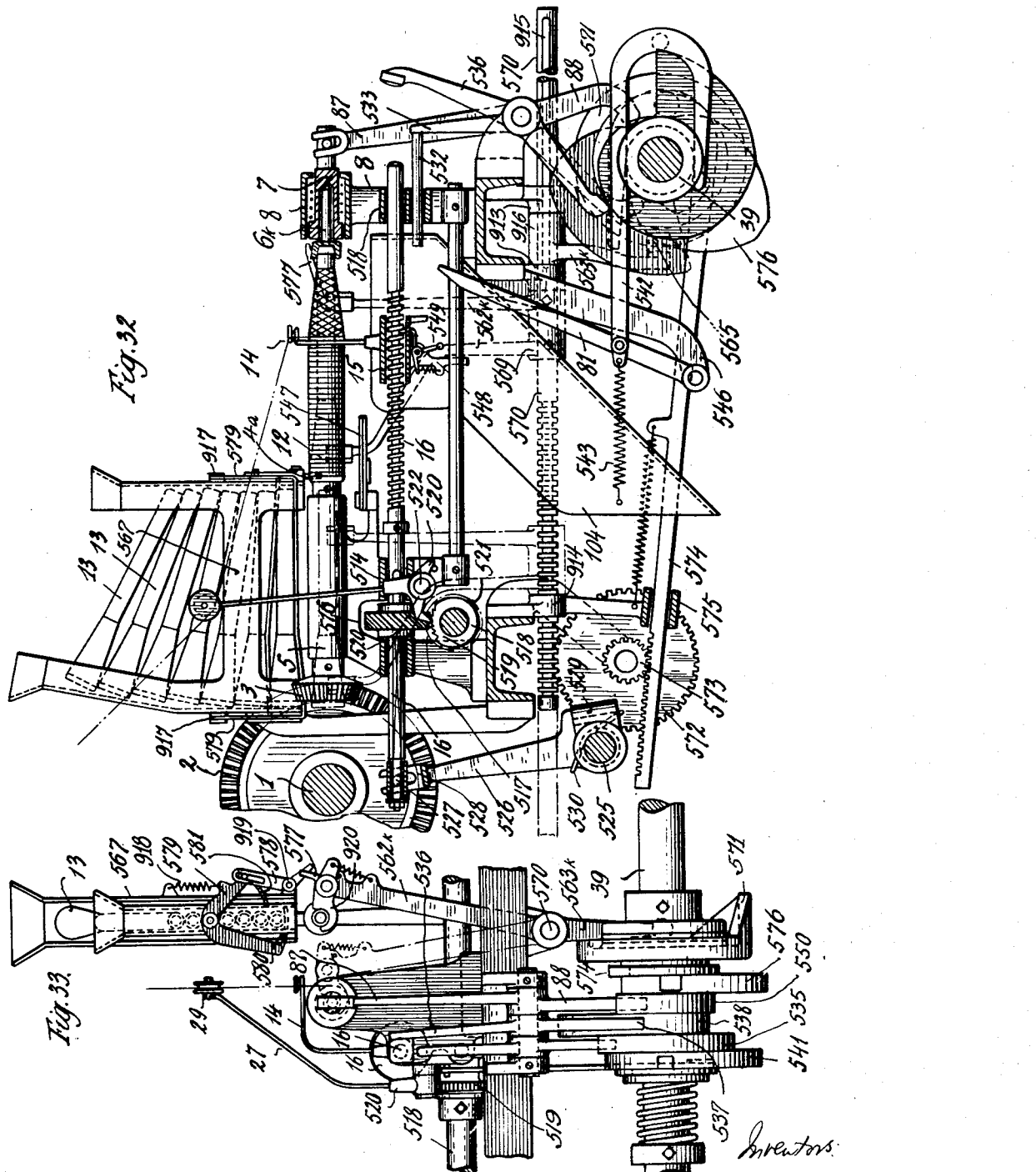

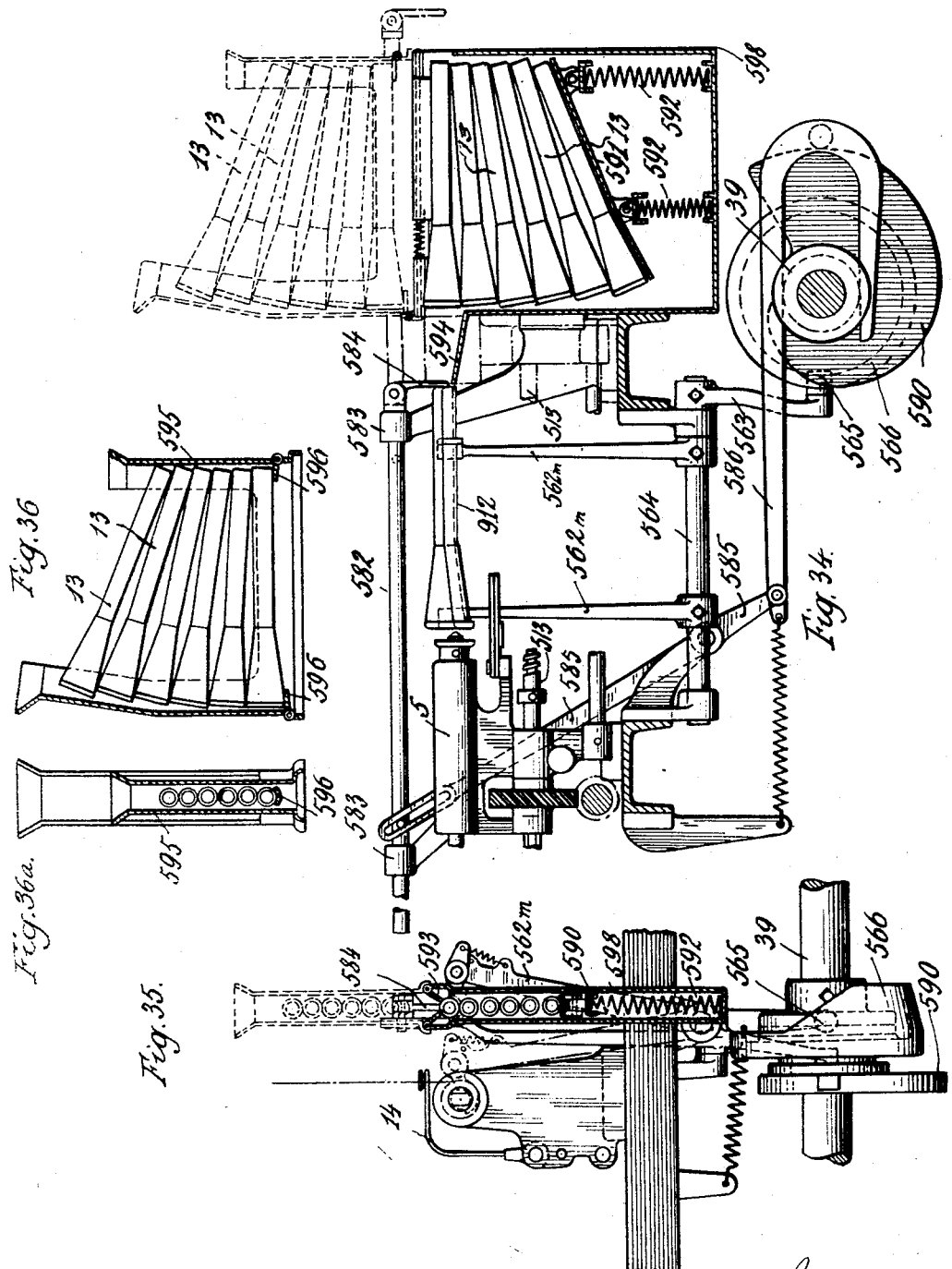

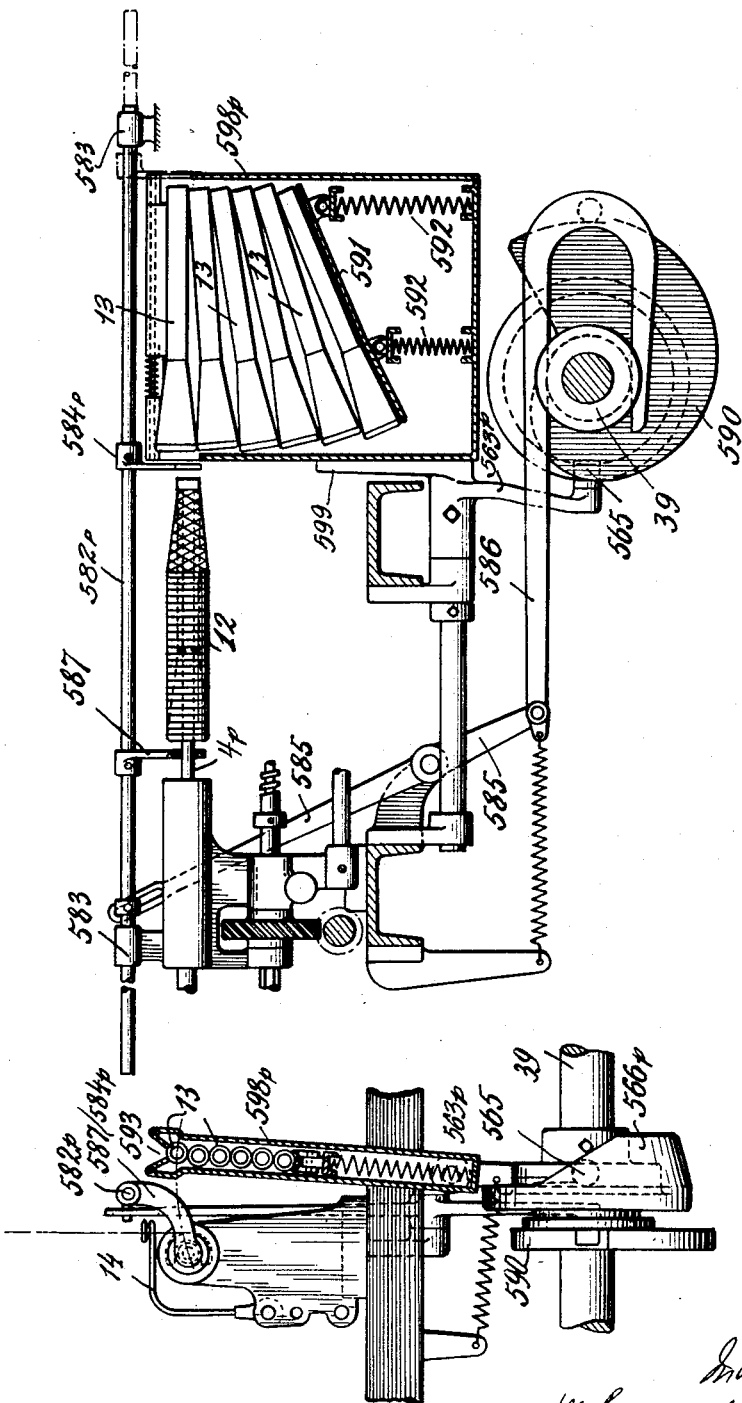

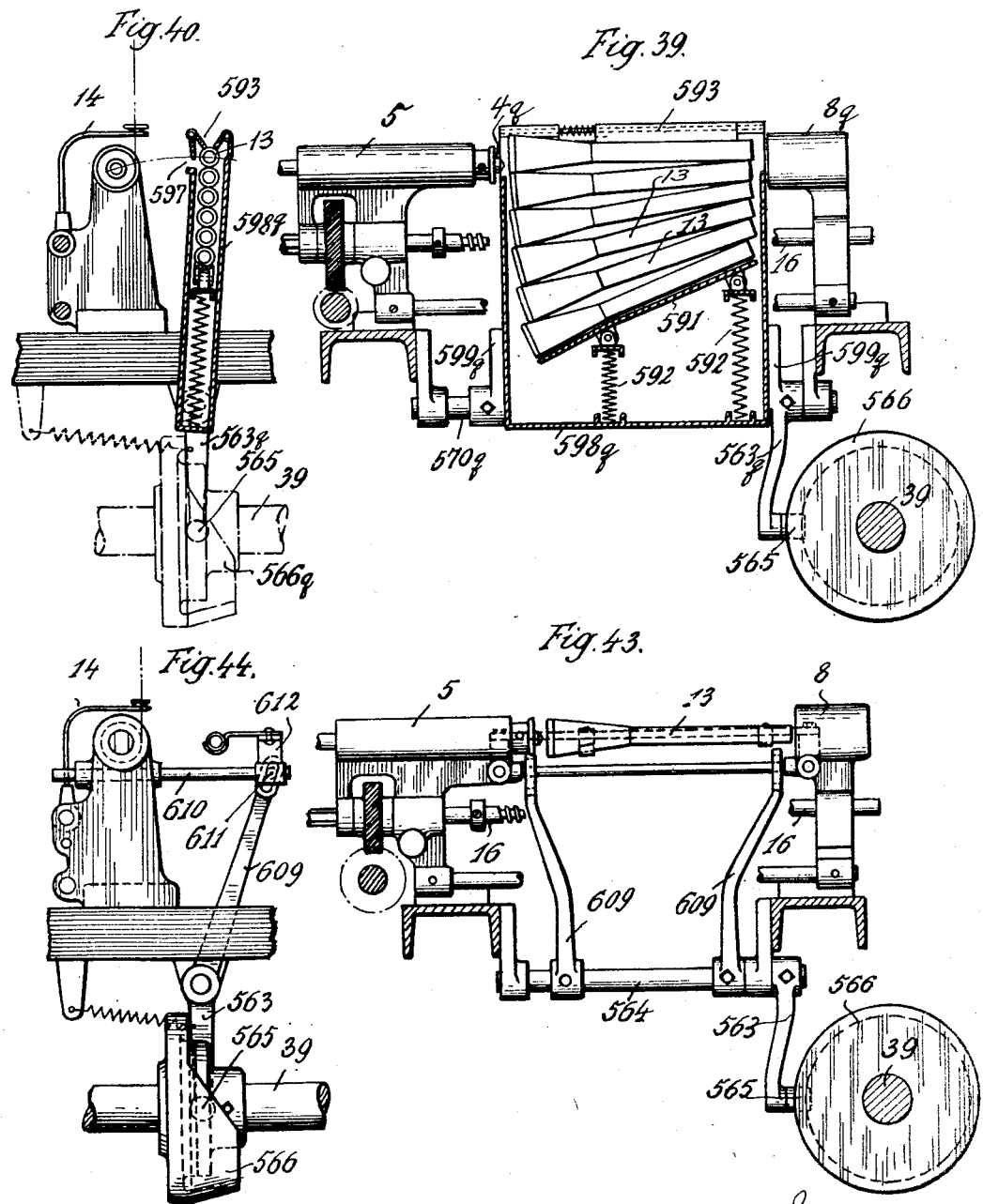

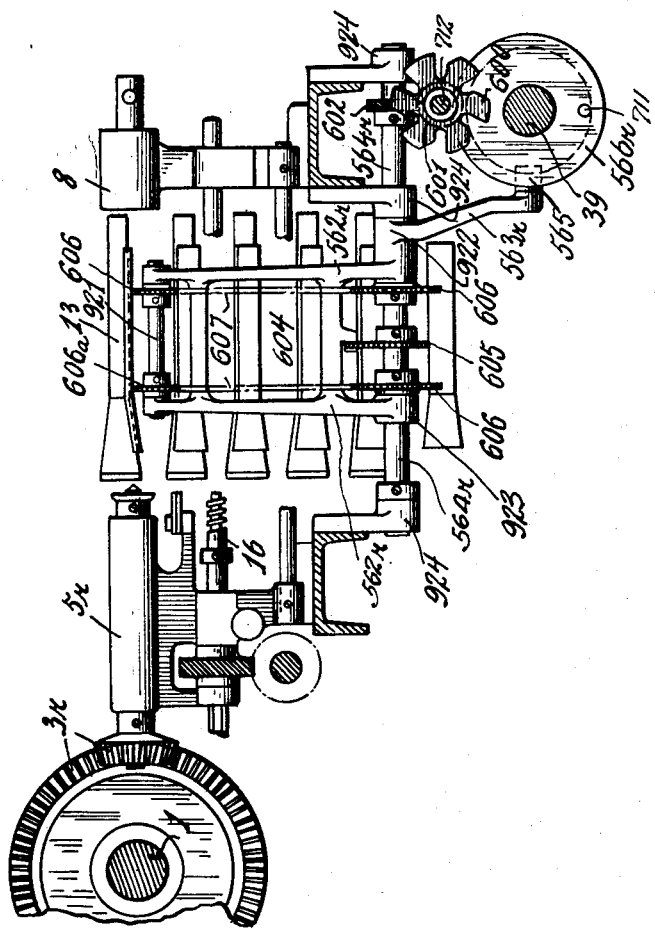
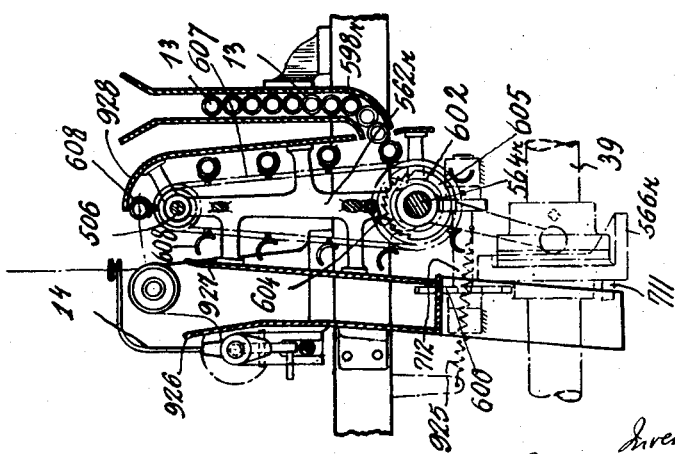

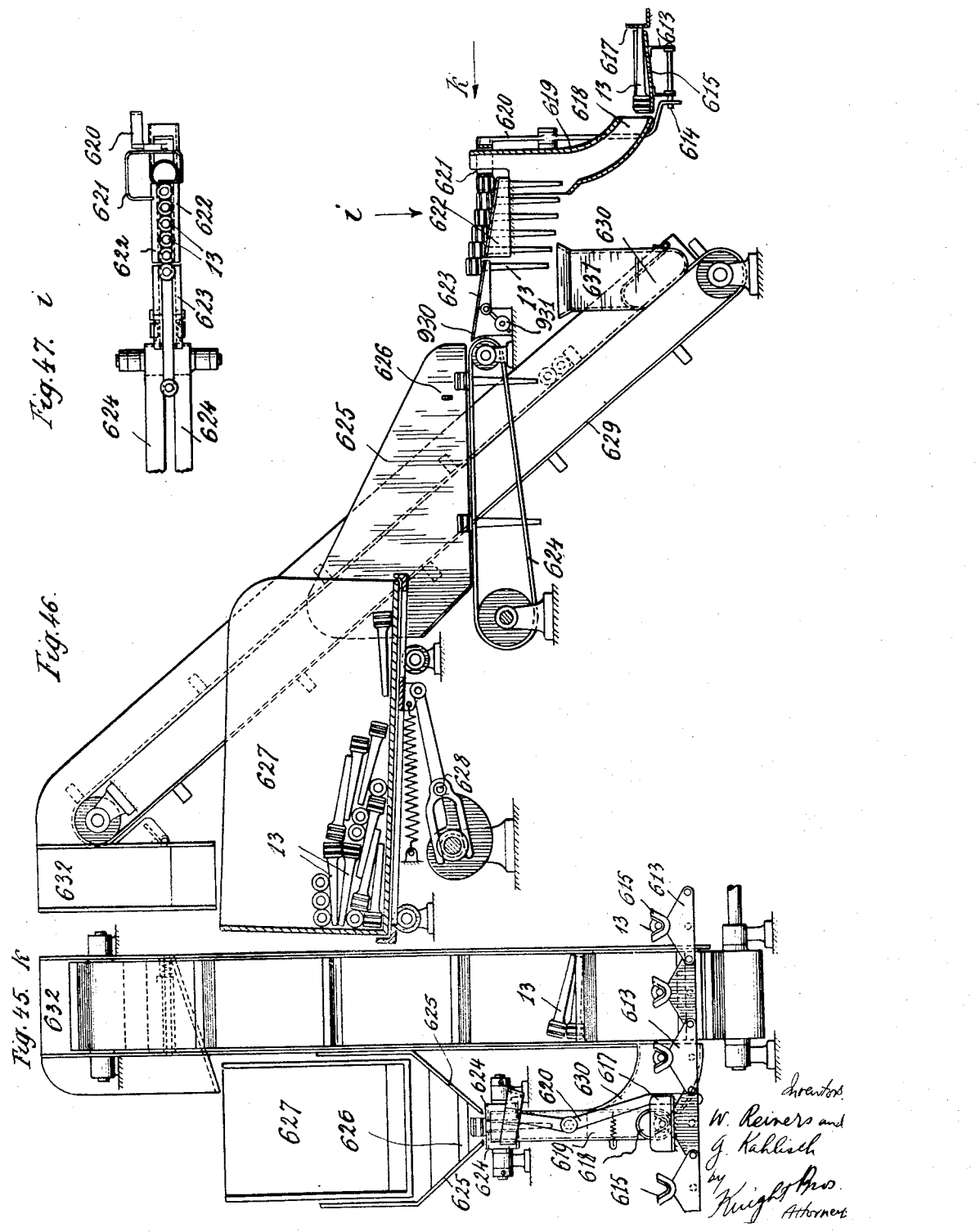

Patented Mar. 11, 1941

2,234,355

UNITED STATES PATENT OFFICE 2,234,355

COP WINDING MECHANISM

Wilhelm Reiners, Gladbach-Rheydt, and Gustav Kahlisch, Rheydt, Germany, assignors to W. Schlafhorst & Co., Gladbach-Rheydt, Germany, a corporation of Germany Application March 27, 1936, Serial No. 71,266
In Germany April 2, 1935

26 Claims. (Cl. 242—32)

All cop winding frames heretofore constructed may be considered as belonging either to one or other of two distinct kinds, namely those in which the spindles are grouped so that all spindles in a group are interdependent, with regard to the building up of the cops and those in which the building up of the cop on each spindle is quite independent of the process on the rest of the spindles.

The first group of machines, in which the cop formation is synchronous on all the spindles of a particular group has the advantages of easy manipulation, a small number of manual operations, and consequently the highest possible output per operative, resulting in a small wage bill. On the other hand, the method has serious drawbacks, resulting frequently in sloughing in the shuttle. If a yarn breaks on any of the spindles the regular formation of the cop is interfered with, and even if the cop is subsequently filled up on an auxiliary machine there is great risk of sloughing in the shuttle on account of the difference in the density of the package.

In those machines in which all the yarn guides of a group move simultaneously with regard to their spindles, there is also a zone of uneven density, with the same risk of sloughing in the shuttle, because where an end has failed the yarn guides will have proceeded for some distance before the end has been re-pieced and the spindle re-started.

The object of our invention is to incorporate certain devices in machines of the first mentioned kind so as to secure therewith the advantages associated with the second kind, so that ease of manipulation and high output per operative are obtained together with the building-up of cops of uniform density throughout in spite of such accidental interruptions as may occur during their formation. Another advantage is the immediate automatic doffing of each cop or bobbin when full, independently of the others, and in the case of machines which wind on tubes there is automatic feed of an empty tube from a supply which may be constantly and automatically replenished from a central distributing place.

In view of the very great number of modifications which may be necessary in connection with the typical embodiments of the invention now to be described in view of the great diversity of bobbins and cops which must be provided for in practice, the examples shown must of course be limited to standard types, which may be subject to alterations without thereby passing outside of the scope of the invention.

In the accompanying drawings—

Fig. 1 is a side view, partly in section, showing a winding point wherein the cop and spindle have a rotary and reciprocating movement, and the yarn guide has a positive feed movement.

Fig. 2 is a front view of three winding points belonging to a single group, the second and third winding points being shown in different positions, and parts of the mechanism in front being broken away or omitted for the sake of clearness of illustration of parts behind. The winding point at the left is a view from the direction indicated by the arrow a in Fig. 1; the winding point in the middle is a view from the direction indicated by the arrow b in Fig. 1; the winding point at the right is shown in a section on the line 2—2 of Fig. 1.

Fig. 3 is a plan view of two winding points certain parts of the mechanism being omitted.

Fig. 4 is a side view, similar to Fig. 1, showing the parts of a winding point in a different position.

Fig. 5 is a side view, partly in section, of a winding point with a device for winding preliminary turns of yarn on the cop tube.

Fig. 6 is a side view, partly in section, of a winding point, similar to that shown in Fig. 5, with means for fastening the end of the yarn to the cop.

Fig. 7 is a side view, partly in section, of a winding point wherein the cop and spindle have a rotary and feed movement, and only the yarn guide has a reciprocating traverse.

Figure 1:
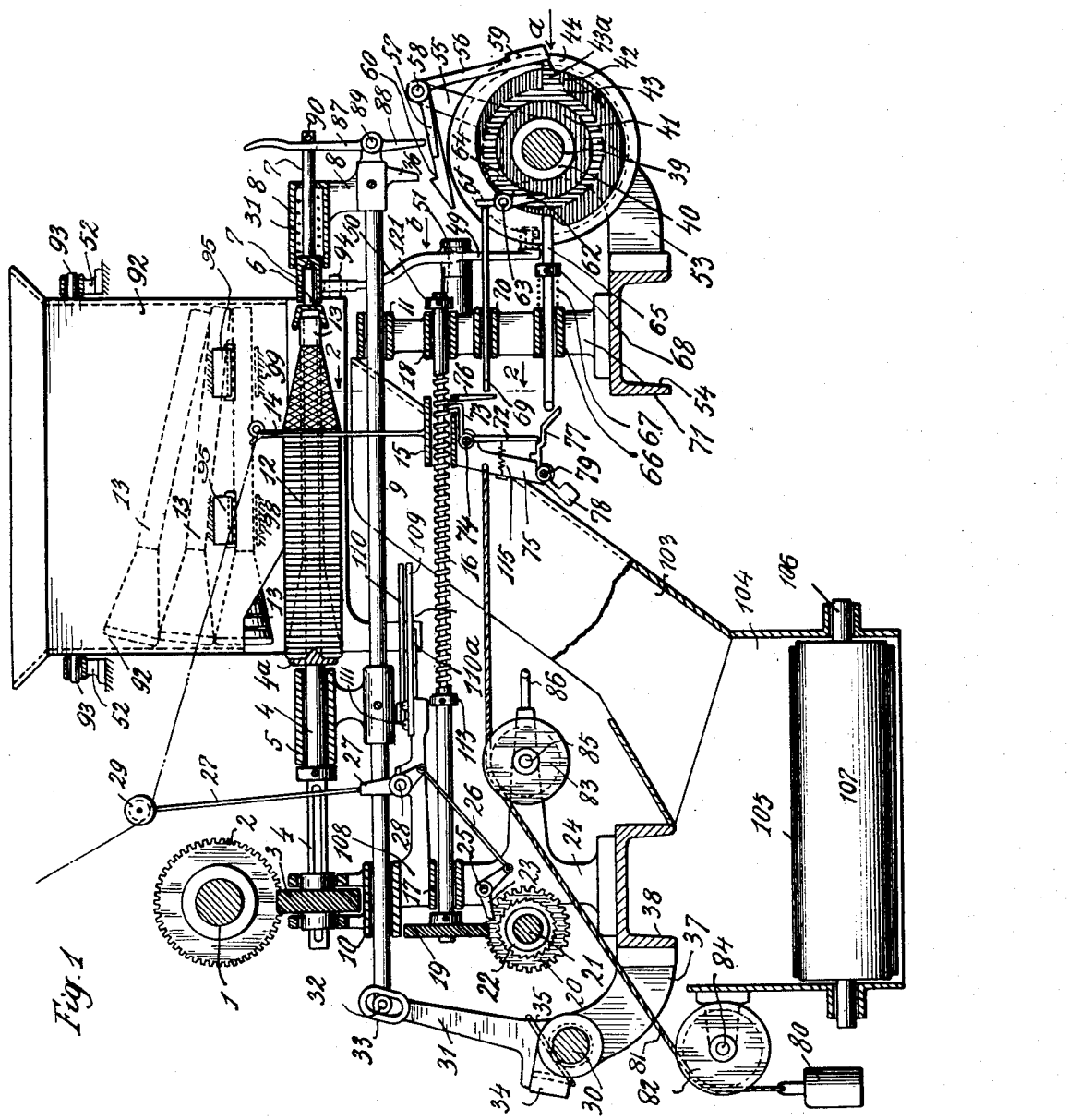

Fig. 8 is a side view, partly in section of a winding point embodying certain modifications and wherein the cop and spindle have a rotary and feed movement, the yarn guide being controlled by a feeler or contact wheel, Fig. 9 is a side view, partly in section, of another winding point, wherein the cop and spindle only rotate and the yarn guide has a reciprocating movement and a positive feed movement.

Fig. 10 is a side view, with parts in section, of a modified form of the invention.

Fig. 11 is a sectional view of the left end of Fig. 10, showing the parts in a different position.

Fig. 12 shows in side view, partly in section a winding point which is in part electro-mechanically operated.

Fig. 13 is a similar view of a winding point which is mechanically operated throughout.

Fig. 14 is a sectional side view of a complete winding point for tube cops and wherein the cop rotates with its spindle; the cop has a feed movement without the spindle and the yarn guide has a reciprocating movement.

Fig. 15 is a plan view, partly in section, of the driving gear for doffing and donning the cops, Fig. 16 is a section of a clutch for the cop doffing and donning device.

Fig. 17 is a side view, partly in section, of a complete winding point in modified form for tube cops. The cop and spindle rotate, the cop has a feed movement on the spindle, and the yarn guide has a reciprocating movement.

Fig. 18 shows the clutch for the cop doffing and donning device.

Fig. 19 is a sectional side view, of a winding point embodying certain modifications. The cop and spindle have a rotary and feed movement and the yarn guide is controlled by a feeler or contact wheel.

Figs. 20 and 21 are vertical sections of the device shown in Fig. 19, respectively on the lines 20—20 and 21—21.

Figs. 22, 23 and 24 show in front elevation, section and cross section respectively a further modified form of clutch and cam gear for the cop doffing and donning device.

Fig. 25 shows a third form of clutch with cam gear.

Figs. 26 and 26a are respectively a side view and an edge view, partly in section, of a cam.

Figs. 27 to 47 show modified forms of doffing and donning mechanisms.

Figs. 27 and 28 show an automatic feed device for the storage container illustrated in Figs. 1–4.

Fig. 29 shows diagrammatically different positions from which the storage container is movable to its operative position.

Figs. 30 and 31 are respectively a side view and front view, partly in section, of a complete winding point with a storage container adapted to swing automatically to operative position, the spindle rotates, and the yarn guide has both a reciprocating and a feed movement.

Figs. 32 and 33 are side and front views respectively, partly in section, of a winding point similar to that shown in Figs. 30 and 31, with a storage container adapted to be automatically tilted to its operative position.

Figs. 34 and 35 are side and front views respectively partly in section, of a winding point with a storage container arranged in front of the machine, the tubes being pushed into operative position.

Figs. 36 and 36a show in side elevation, and cross section, respectively, a tube collecting frame for feeding the magazine.

Figs. 37 and 38, are side and front views respectively, partly in section, of a winding point with an automatically feeding container in front of the machine.

Figs. 39 and 40 are side and front views respectively, partly in section, of a modified form of a container adapted to be rocked to supply any selected winding point.

Figs. 41 and 42 are a side view and front view respectively, partly in section, of a conveyor device for feeding the tubes.

Figs. 43 and 44 are side and front views respectively, partly in section, of a tube feed device having a parallel feed movement from a preliminary position to operating position.

Figs. 45, 46 and 47 show in side, front and plan view respectively, partly in section, a device for arranging the cop tubes; Fig. 45 being a view taken in the direction of the arrow $k$ in Fig. 46 and Fig. 47 being a view taken in the direction of the arrow $i$ of Fig. 46.

Figs. 1 to 13 and 18 to 21 show stub spindle machines, in which the cop tube 13 is held in known manner between a driving stub spindle 4 and a counterstub 6, without a full length spindle extending through the cop tube.

Fig. 14 shows a construction with full length spindles. The invention is not confined to machines having these features.

In the machines heretofore known without full length spindles it is not possible to impart to the cop a reciprocating movement, or a feed or building movement in one direction, in addition to a rotary movement, owing to the spindle bearings being fixed. In order to enable the cops in stub spindle machines to have a reciprocating or one way feed movement or a composite reciprocating and feed movement, we arrange the bearings for the driving stubs and the counterstubs in connection with each other so that they move in conjunction, the two bearings 5 and 8 (Fig. 1) being for example fixed to a rod 9 axially slidable in bearings 10 and 11.

Referring first to the construction shown in Figs. 1 to 6, the spindle 4 has a rotary movement in bearing 5 and a reciprocating traverse, the rotation being imparted to the rearward extension of the spindle by the drive shaft 1 by spiral gears 2, 3. To allow of reciprocating movement the spindle 4 is splined to the gear wheel 3. The cops 12 are wound on tubes 13 supported by the stub spindle 4 and a tail stock comprising a swivel cup 6 and socket shaft 7 supported for rotation in bearing 8. The reciprocation of the cops 12 and their bearings, for each group of winding points, is effected by a rock shaft 30 driven from the main drive of the machine. On said shaft 30 there is provided for each winding point a rocker lever 31, which is loose on the shaft 30 and is rocked by the same by means of yoke 34 and a spring 35, the yoke being fixed to the shaft 30. This mechanism constitutes a yielding actuator for imparting the traverse movement to the cop. The reason for the yielding connection will appear presently. The lever 31 is provided at its upper end with a slot 33 engaged with a roller 32 carried by a slidably supported connecting rod 9 connected at the other end to the parts 5 and 8, so that the parts 5, 6 and 8 and the cop 12 are reciprocated by the rocking movement of the shaft 30. Although all the winding points have a common drive, the spring connection of the rocker 31 to the rock shaft 30, together with means, hereinafter described for applying at a suitable point resistance to such reciprocation, enables the reciprocation of any one of the several cops to be stopped to permit of separately donning or doffing any of the cops while the others are in operation. The building movement is imparted to the yarn guides for all the spindles of a group positively and collectively. For this purpose a drive shaft 21 has mounted thereon a number of spiral gear wheels 20, one for each winding point, each of said wheels being in mesh with a gear wheel 19 fixed to a screw spindle 16 for actuating the yarn guides. Each of said spindles 16 is rotatably mounted in bearings 17, 18 and is held against axial movement by the wheel 19 and collar 121. 14 is the yarn guide, which is fixed to a sleeve 15 loose on the screw spindle 16. Sleeve 15 has an arm 75 to which is pivoted at 74 a bell crank 72, 73, the arm 73 of which projects through a slot in the sleeve 15 and is adapted to engage with the screw thread of the spindle 16, so that the building movement is imparted to the yarn guide by the rotation of said spindle 16. This building movement must be interrupted at the moment when the winding of the cop is complete, for which purpose the lever 72, 73 must be automatically disengaged from the screw thread of the spindle 16 at the proper time. To the arm 75 is pivoted at 79, a latch 78 provided with a shoulder 77, against which the lower end of the arm 72 is held during the winding operation by a spring 115 connected at one to the arm 72 and at the other end to the arm 75.

In the event of rupture of the yarn the building movement of the yarn guide is stopped, for which purpose each gear wheel 20 is provided with a ratchet wheel 22 adapted to be engaged with a pawl 23 pivoted at 25 to the frame 24. The pawl 23 is connected by a rod 26 to one arm of a detector lever 27 pivoted at 28 to an arm 108 on the frame 24 and provided at its upper end with a yarn guide roller 29. In the event of yarn rupture the detector 27 drops to the left hand side until the pawl 23 engages the ratchet wheel 22. Gear wheel 20 and ratchet wheel 22 are coupled by a yielding clutch with their shaft 21 so that the drive for the yarn guide is interrupted as soon as the pawl 23 engages the ratchet wheel 22, the interruption continuing until the yarn is pieced together again. To this end the operative has to release the cop from its engagement between the parts 4 and 6, by operating a hand lever 87, which acts against a pin 90 on socket shaft 7 to pull the latter to the right (Fig. 1) against the action of a spring 31. The operative is then able to piece together the yarn, whereupon the detector 27 returns to operative position and the pawl 23 is consequently disengaged so that the driving of the yarn guide is resumed. The following device is provided to stop the building movement of the yarn guide when the winding of the cop is complete and also to initiate the several other automatic movements associated with the donning and doffing of the cops.

A drive shaft 39 is revolvably supported in bearings 53 on the bank frame 54, said shaft being driven at each winding point, or preferably by a common drive for all the winding points. Said shaft 39 carries a sleeve 40, one end of which forms a member 40a of a friction clutch (Figs. 2 and 3), loose on the shaft 39, and coacting through a friction disc 48 with a complementary clutch member 45 splined to the shaft 39. A clutch spring 46 is disposed between the clutch member 45 and a collar 47 on the shaft 39. Fixed to the sleeve 40 are cams 42, 43, 44 and a disc 41, the latter serving during the winding operation to lock the automatic doffing and donning device. For this purpose the disc 41 is provided with a shoulder adapted to engage a detent lever 61, 62, pivoted to a stud 63 on an arm 64 on the frame member 53. As soon as the cop 12 is fully wound a lug 76 on the sleeve 15 abuts against a push rod 69 slidable in bearings 70 in the frame part 71, so that the detent lever 61, 62 is disengaged from the shoulder on the disc 41. As, however, the disc 41 with its sleeve 40 and all the cams thereon is driven by the clutch 40a, 45 which is then no longer held, all the said cams and the disc rotate with the shaft 39 until the detent 61, 62 again engages the shoulder on the disc 41. The release of the cams and disc as above described results first of all in the yarn guide 14 being returned to its initial position shown in Fig. 4. For this purpose the arm 73 is disengaged from the screw spindle 16 by the automatic release of the catch 77, such disengagement being effected, as soon as the control discs are released, by the cam 42 on the sleeve 40 pushing endwise a rod 65 slidable in bearing 66, so that said rod 65 is caused to engage the latch 78 and thereby rock its shoulder out of engagement with the arm 72, with the result that the arm 73 is pulled by the spring 115 out of engagement with the screw spindle 16. Thereupon the yarn guide 14, 15 is returned to its initial position (Fig. 4), independently of any of the yarn guides of the other spindles, by a weight 80 with cord gear 81—85. At the same moment the following control mechanism becomes operative:

During the winding operation the cam 43 on sleeve 40 holds, with its nose 43a, a bell crank lever 59, 60 (Figs. 1, 2, 3, and 4) out of engagement with a lug 36 on the bearing 8. The bell crank lever 59, 60 is rockably mounted on a pin 58 supported by an arm 55 of the frame 53. When the cams rotate, the nose 43a releases the lever 59, 60 so that the hooked end of its arm 60 engages the lug 36, as shown in Fig. 4, thereby stopping the traverse movement of the spindle. During the movement to the right of the bearings 5, 9, 8, by the action of rocker arm 31, the arm 57 of a second bell crank 56, 57, likewise rockably mounted on the pin 58 and released by the nose 43a on the cam 43, abuts against the arm 88 of the lever 87, 88 and rocks the latter into the inclined position shown in Fig. 4. At the same time the arm 87 engages the pin 90 on the spring loaded socket rod 7 of the tail stock 6, 7, so that the cop is disengaged from the members 4 and 6 and drops into the open inclined trough 103 of the collecting container 104. The yarn guide 14, which in the meantime has been moved back to its initial position shown in Fig. 4, has moved the end of the yarn to the position shown in Fig. 4, where it passes from the yarn guide 14 to the cop in the container 104. In this position the cop faces the spindle flange 4a and lies between the blades 110, 110a and 109 of a cutter, the blade 109 being stationary and the blade 110, 110a pivoted. The blades 109 and 110a are provided with cutting edges.

As soon as the fully wound cop is released from the members 4, 6 the cop doffing and donning device initiates the delivery of a fresh cop tube. There is for each winding point a storage container 92 adapted to hold a number of tubes. Fig. 2 shows the container in three different positions, the first position, viewed in the direction of the arrow a in Fig. 1, representing the normal position at the side of the spindle during the winding operation. The container 92 is supported by two trunnions 93 on the stand 52, and its upper end is flared at 256 to facilitate the introduction of the cop tubes. On the stand 52 are arranged two tube carriers 98 and 99, which project through slots in the container 92 so that they carry all the supply tubes 13 when the container is in the normal upright position shown in Fig. 2a. Disposed opposite these carriers 98, 99 between the lowermost tube and the one above it there are two pointed blades 95, fixed to the stand 52, the points of these blades projecting through slots in the container 92 when the latter is in the normal position, so as to separate the lowermost tube from that above when the container 92 is tilted to the position of view b. Below the discharge mouth of the container 92 there are two pivoted flaps 100, 101, which are under the influence of springs 261 tending to swing them up. At the lower rear end of the container 92 there is fixed an arm 96 (Figs. 1 and 2) and above same is a pivot pin 94 engaging in a slot in a lever 49, 50 pivoted at 51 to the stand 52. This arm 49 of this lever carries a roller 114 which is held by the weight of container 92 against the face of the cam 44 of the cop donning and doffing mechanism. During the rotation of said cam 44 projections 44a on the face thereof cause the lever 49, 50 to rock, so that a fresh tube is fed to the operative position of the spindle. View b in Fig. 2 shows how this movement is initiated shortly after the finished cop 12 has dropped from its operative position, after the container 92 has been tilted to a certain extent. The lowermost cop tube has dropped onto the flaps 100, 101 owing to the tube carriers 98, 99 releasing the cops when the container 92 tilts, and at the same time the blades 95 pass underneath the remaining tubes in container 92. In the meantime as shown in section 2—2, Fig. 2, the lever 49, 50 has reached the peak of the cam face 44a on cam 44, so that the new tube is positioned for clamping between the parts 4a and 6. Simultaneously the cam 43 completes its revolution and its nose 43a moves the two levers 56, 57 and 59, 60 from their engaging position shown in Fig. 4 to the releasing position shown in Fig. 1, so that the spring loaded cup 6 clamps the fresh tube between itself and the drive spindle 4. The rod 9 is then free to move again under the influence of the member 31 and shaft 30, said member 31 being again operative. The container 92 has in the meantime been tilted back to its original position shown at a in Fig. 2.

When the new cop tube is clamped in operative position as above described the beginning of the thread in front of the spindle flange 4a is also clamped. As the container 92 is moved to the position shown in Fig. 2, section 2—2, the arm 96 of the container 92 abuts against the movable blade 110 and 110a of the cutter so that the blade 110 guides the pendent thread over the stationary blade 109 and the lower blade 110a severs the end of the yarn of the discharged cop from the commencement of the yarn for the new cop. The movement of the blade 110, 110a is also illustrated in Fig. 3, the broken lines indicating the normal position of the blades 110, 110a and the full lines the above described operative positions of blades 110, 110a.

At that moment when the yarn guide 14 reached its initial position (Fig. 4) as above described, its bell crank 72, 73 engaged the abutment 86 on the stand 24, so that the arm 73 again engaged the thread of the screw spindle 16, in which position it is held by the catch 77, 78. As the new cop tube has in the meantime been clamped the winding operation recommences. At the same time the lever 61, 62 returns to the locking position shown in Fig. 1, so that the doffing and donning mechanism is inoperative.

An endless belt 105, travelling over rollers supported by shaft 106 may be arranged in known manner in the cop collecting container 104 for the purpose of carrying away the finished cops.

With regard to Fig. 3, it is to be noted that it only shows in plan the most important parts associated with two winding points, the drive for the cop and the cop doffing and donning mechanism being in the main shown with reference to one of the winding points, whereas for the other only the cop supporting means, the yarn severing device and the drive for the yarn guide building movement spindle 16 are shown.

Fig. 5 shows the arrangement of an additional cam 136 for the cop doffing and donning device, applied to the construction shown in Figs. 1 to 4 whereby additional turns of yarn 134 may be automatically wound on the tube at the commencement of the winding operation in a manner already known in connection with automatic looms. After the fresh cop tube has been placed in position the yarn guide occupies the position shown in full lines in Fig. 5.

In this case the builder spindle 16a is slidable axially. A spring 122 between a collar 121 and bearing 18 urges the spindle towards the position shown in broken lines, but its thrust is resisted by a shoulder on cam 136, engaged with a lever 118, 119 pivoted to an arm on the frame part 53. As soon, however, as the new cop tube 13 is in position the cam 136 is in the position shown in Fig. 5, and immediately afterwards the lever 118, 119 rocks into the position shown in broken lines in Fig. 5, and the yarn guide spindle also moves so that the yarn guide arrives in the position shown in Fig. 5 in broken lines to produce the windings 134 on the cop. In order to lay these windings cross-wise the lever 118, 119 is actuated by a series of rises 137 on the cam 136, so that the yarn guide 14 with its spindle 16 is moved for cross winding. At the end of this operation the cam is stopped by the lever 61, 62 engaging the shoulder on the disc 41, as shown in Fig. 1, and the cop donning and doffing device is also locked. The yarn guide then commences its building movement to build up the cop.

Fig. 6 shows an additional device used, for example, in the case of slippery yarn. This device is associated with the doffing and donning device and causes the end of the yarn to be automatically clamped to the foot of the cop tube. The yarn guide is moved in the same way as in the construction shown in Fig. 5. The foot of the cop tube 13 has an annular groove for reception of the end of the yarn. Means are also provided whereby with automatic doffing and donning the movement of the spindle may be stopped and started, this being controlled by the device for securing the end of the yarn to the cop foot. The automatic doffing and donning mechanism is controlled by two cams 132, 133 which are additional to the cams described with reference to Figs. 1 to 4. In Fig. 6 the cop 12 is shown as fully wound, and the yarn guide is still opposite the yarn clamping position. The lever 118, 119 hereinbefore referred to then engages with its arm 119 the peak of the cam 133, so that the builder spindle 16 is pushed rearwards and the yarn guide with the yarn is positioned as shown in Fig. 4, that is to say, against the outer face 4a of the spindle flange, and at this moment the doffing and donning operation is initiated by the cam above described. By this time the cam 132, Fig. 6, has rotated so that the rod 123 is pushed rearwards and the collar 131, with the aid of the lever 128, 129 pivoted at 130, temporarily disengages the clutch 124, 125 driving the spindle. The clutch is immediately engaged again by the spring 127 when rod 123 has cleared the peak of the cam 132.

This clutch action for temporarily disengaging the spindle drive is, of course, applicable in the same or a similar manner to all constructions of cop winding machines to which the present invention is applicable.

Fig. 7 shows a modification. In this case the cop with its bearings has a rotary and feed or building movement, and the yarn guide has merely a rocking traverse for the winding of the cop chase. The cop with its bearings 4, 5, 6, 8, 9 is mounted for endwise sliding movement as in the construction shown in Figs. 1 to 6, and its building movement is effected by engagement of the bearing 5 with the screw spindle 16. The several screw spindles of a group of winding points have a common drive, as in the construction according to Figs. 1 to 6, the drive being taken from shaft 21 through gears 20, 19 at each winding point, the gears 20 being frictionally connected to shaft 21 and having fixed to them ratchet wheels 22. In this construction also there is pivoted at 164 to the sleeve 160 on the screw spindle a bell crank 162, 163, the arm 163 of which, under the influence of a spring 161, connects the cop bearings to the screw spindle 16 during the operation of the winding point. The building movement of the spindle bearings is interrupted in the case of yarn breakage by the detector 29, 27, connecting rod 26, and pawl 23 pivoted at 25, said pawl remaining in engagement with the ratchet wheel 22 until the yarn has been pieced together. The yarn guides 14a, which in this case have a rocking traverse movement about a stationary axis, are all resiliently connected to a continuously operating rock shaft 138, such resilient connection being similar to the connection of the lever 31 to its shaft 30 as described in connection with the first construction shown in Fig. 1. The object of such a connection is to enable the yarn guides to be held against operation during automatic doffing and donning of the cops at that moment when the yarn, in accordance with Fig. 4, is positioned in front of the face of the spindle flange 4a, so that it may be clamped between said flange and the foot of the cop tube 13 to serve as the beginning of the yarn for the new cop tube 13. Such cessation of operation of the yarn guides is effected by a special cam 143, with a coacting lever 142, 143, connecting rod 141 and a stop collar 141a on the latter.

The automatic doffing and donning operation is effected in this case in the following manner:

During operation of the winding point the cam 41 is held against rotation, as in the first described construction, by a similar bell crank 61, 62 so that the whole doffing and donning mechanism is held inoperative. Shortly before the cop 12 is completely wound the lower nose of the lever 146 (Fig. 7), pivoted to a fixed arm 135 on the bearing 8, engages one arm of the detent lever 61a, 62a, so that after a few layers of yarn have been applied to the cop said lever 61a, 62a is disengaged from the cam 41 and the whole doffing and donning mechanism commences to operate. A lever 154 bears with its roller 165 against a cam 147 and has at its free end a slot in which engages a pin on a connecting rod 157 guided for axial movement in bearings 66, 66a and carrying at its other end an arm 158 with an abutment pin 158a. At the commencement of the doffing and donning operation the pin 158a first engages the bell crank 162, 163 and rocks the latter out of engagement with the thread on the spindle 16 so that the spindle bearing 5, 8, 9 is disconnected from the screw spindle 16. The cam 147, however, continues to rotate so that it rocks the lever 154 and the rod 157 is moved accordingly. The pin 158a engages the lever 162, 163, thereby rocking the latter so that the arm 162 of said lever engages a pin 164a on the sleeve 160 of bearing 5, and as a result the whole bearing for the cop is carried forward until the lower arm of lever 87, 88 engages the arm 150 of a lever 150, 151. This resistance causes lever 87, 88 to be rocked to the inclined position shown in Fig. 4, so that the finished cop 12 is doffed and drops into the collecting container 104.

Due to the continued rotation of cam 147 the cop bearing is returned to its initial position— not shown in Fig. 7—which is determined by the upright position of the yarn guide 14a as shown in Fig. 7, i. e. the front face of the spindle flange 4a will be immediately below the centre of the guide eye in the yarn guide 14a. The doffing and donning operation is continued in the manner hereinbefore described with reference to the first construction, for which reason the central mechanism is not shown in this case.

A third modification is shown in Fig. 8, wherein only those parts of the mechanism are shown which differ from those hereinbefore described. The cop rotates and has a reciprocating traverse as in the first construction. The yarn guide has a straight building movement in one direction; it is not positively operated, but is traversed by means of a feeler wheel 170. The cop is rotated and traversed in the same way as described with reference to Figs. 1 to 6, and its rotation and traverse in the bearing members 5, 6, 8, is the same and therefore not particularly shown. Instead of the yarn guide 14 being positively moved, it is advanced by the feeler wheel 170 fixed on the screw spindle 16b, which coacts through the yoke 169 with the thread guide 14b. At each stroke of the cop 12 the feeler wheel 170, as the result of the laying of further layers of yarn, is rotated to a definite extent in known manner. A three armed lever 171, 172, 173 mounted on a stationary pivot 171a engages the thread of the spindle during the operation of the winding point, so that the above mentioned intermittent rotation of the feeler wheel 170 causes the spindle 16b with yarn guide 14b to be moved forward correspondingly. The movement of the cop is automatically stopped and the doffing and donning operation is initiated in the manner hereinbefore described with reference to the previous constructions, by means of a cam (not shown in Fig. 8) set in motion by the release of disc 41 from lever 61, 62 upon engagement of yoke 169 with push rod 69 when the cop reaches its prescribed length. At the same time cam 174 revolves and its crest 175 raises arm 171, disengaging tongue 173 from the thread of spindle 16b, so that the yarn guide device is rapidly returned to its initial position at the foot of the cop by the weight and cord device 80, 81b, 82b, 84b, in a manner similar to that described with reference to the first construction of the machine. Arriving at this position the downwardly extended bracket 169 of the yarn guide engages a collar 168 on the rod 167, so that the lever 171, 172, 173 is caused to again engage the thread of the spindle 16b with consequential renewed building movement of the thread guide after completion of the doffing and donning operation. The lever 171, 172, 173 may be held in operative and inoperative position by a spring 176 having two recesses into either of which the end of lever arm 172 is adapted to engage. Fig. 9 shows a fourth constructional example, only those mechanisms being shown which differ from those above described. The cop 12 with its spindle 4c and spring loaded swivel cup 6 only rotates, and the yarn traverse and building movement are effected positively by the reciprocating yarn guide spindle 16c and the yarn guide 14c which moves forward for each new layer of yarn. At each winding point the spindle 4c is rotated by a pair of bevel wheels 2c, 3c, the drive wheel 2c being fixed to a drive shaft 1 common to the whole group of spindles. The spindle 16c is driven by a pair of spiral gear wheels 20, 19c, as in the first construction, Figs. 1 to 6, 21 being the drive shaft common to the whole group of spindles. The spindle 16c with yarn guide 14c is slidable in bearings 17c, 18c and has a splined engagement with the wheel 19c between the bearings 17c, 17a. The rear end of spindle 16c carries a cup bearing 177 provided with a pin 32 engaging in a slot 33 in the free end of the rock lever 31c. There is a lever 31c for each winding position and they are resiliently connected to a common shaft 30 in the manner above described with reference to the previous constructions. The periodical interruption of the rotation of the spindle 16c and the movement of the yarn guide 14c in the event of the yarn rupture is likewise effected by means similar to those described with reference to the previous constructions, such means comprising the ratchet wheel 22 with pawl 23, connecting rod 26c and yarn detector 27, 29. When the cop is fully wound the doffing and donning device is released in this case also by the yarn guide impinging with its sleeve projection 76 against the lever 61c, 62c which, as previously described, is disengaged from the disc 41, with consequential starting of the doffing and donning operation. In this case again, the doffing and donning mechanism is only illustrated as far as it differs from the constructions previously described.

At the commencement of the doffing and donning operation the nose 183 clears the arm 188 of lever 188, 189 and the end 195 of arm 189 swings up against the end 194 of the spindle 16c, so that the axial movement of the latter is arrested, since the lever 31c is only coupled to the shaft 30 by the spring 35 as previously described. In the meantime the cam 700 has rocked the lever 186 with its roller 187 and consequently moved endwise the connecting rod 178 which slides in its bearings 180, 180a. During this movement of rod 178 its collar 179 engages the arm 72 of lever 72, 73, thus disconnecting the yarn guide 14, 15 from the screw spindle 16c. The reciprocation of rod 178 continues, and the arm 72 engages the pin 164a on the sleeve 15, so that the yarn guide 14, 15 is moved back to its initial position which is shown in Fig. 4. Meanwhile the cam 181 has rocked the lever 192, 193 so that its arm 193 engaging the abutment 90 on said rod 7 retracts the member 6 so that the cop is released, a fresh cop tube being then fitted in its place. The yarn is clamped to the cop and severed by the shears 109, 110, 110a, all of such operations being effected in the manner hereinbefore described in connection with the previous constructions. The winding operation is then re-commenced.

Figs. 10 and 11 show a modified form of device for clamping the beginning of the yarn for the new cop, this device being particularly designed for use where smooth cop tubes are employed with a comparatively slightly tapered foot. The yarn clamping means hereinbefore described with respect to Fig. 4, where the yarn is clamped between the flange 4a on spindle 4 and the broad conical foot of the tube 13, would not be entirely satisfactory where smooth paper cop tubes are used without a cone at the end, that is to say a tube 13d of the kind shown in Fig. 10. To enable the yarn to be secured by the clamping in of the cop between the heads with spindle-less machines, the cop is clamped in behind the cop drives 197, namely between the latter and a flange 201 on the cop spindle or a disc 202 of flexible material driven by said flange having a high coefficient of friction. For this purpose a movable coupling is provided between the driving part 4d and the tube drive head 197, such coupling being designed to transmit the drive from 4d to 197. For this purpose the shank 198 of the spindle head 197 may be provided with a pin engaging in a slot in a sleeve 200, or the rear face of the spindle head 197 may be ribbed or otherwise roughened so that assisted by the end thrust of the cop tube, the head 197 is driven by the spindle by friction. As soon as the completed cop is released and removed by the doffing and donning device the driving head 197 shoots forward, by the action of a spring 200a, so that a gap is provided between its rear face of spindle head 197 and the spindle flange 201, 202 into which gap the beginning or end of the yarn, presented by the yarn guide, snaps. When the fresh tube is donned the spindle head 197 is pressed against the flange 201, 202, and the yarn is nipped. This may be effected while the spindle is running; the nipped yarn cannot be sheared owing to both of the nipping faces rotating together without relative movement between them, in contradistinction to known devices for this purpose where the yarn is gripped between a rotating flange on the spindle and a stationary counter flange.

Figs. 12 and 13 show devices wherein the automatic and independent doffing and donning operations are not only initiated by the longitudinal movement of the means for building up the layers on the cop axially, but also by the axial building up of the layers as such. This device comprises a bell crank lever 206, 207 pivoted at 209 to a fixed part and the arm 207 of which carries a feeler or contact roller 208. The lever is thus held in a preparatory position, its arm 206 being pressed by a spring 210 against an abutment 701 on the frame portion 71. As soon as the cop attains its predetermined diameter the package itself operates the lever by contacting with the roller 208 while the last layers of yarn are being applied. The lever then, as shown in Fig. 12, closes an electric circuit including an electromagnet 204, the armature 203 of which releases the detent lever 61d, 62d of the device for effecting the automatic doffing and donning operation. In the construction shown in Fig. 13, the same lever 206, 207 is employed for the direct mechanical release of the detent lever 61e, 62e of the doffing and donning device. An electromagnetic device for rendering operative the automatic doffing and donning device of the kind described hereinbefore is preferable in some cases to a purely mechanical device, as for instance in those cases where the cam mechanism is too far away from the appurtenant winding point to enable the necessary movements to be produced by purely mechanical means.

Figs. 14, 15 and 16 show the invention applied to a cop winding machine wherein spindles pass right through the cops from one end to the other, as employed, for instance, with tubeless cops or cops with short tubes which only engage in the first winding layers.

In this case the spindle merely rotates, whereas the cop moves longitudinally without the spindle and its bearings, and the yarn guide has a rocking traverse. Reference is made to our copending application Serial No. 182,690, filed December 31, 1937, now Patent No. 2,209,208, wherein this species of the invention is particularly claimed.

The spindle 4f is rotataby and slidably mounted in the frame members 5f and 5a, and a clutch 124f, 125f on said spindle enables the latter to be thrown out of operation in the event of breakage of the yarn, or failure of the feed thereof. The package 12f is formed by cross winding so that the package when doffed will hold together without a tube. A short tube, which only projects into the first layers of yarn, or into a tube cone is only used in those cases where the yarn is drawn off in the loom from the outer layers. The conical cup 219 gives the layers of yarn their conical form and determines the diameter of the cop. The known feeler rollers, of the cylindrical or conical type, which operate in a similar manner to the conical cups 219, may be used instead of the latter. The cup 219 remains stationary during the winding operation, and likewise the spindle 4f in its bearings 5f, 5a. The package 12f is consequently compelled by the layers of yarn constantly wound on the spindle inside the cup 219 to move longitudinally on the spindle 4f of its own accord. In order to produce as firm a package as possible, which is particularly necessary in the case of bast fibre yarn, a bracket 221 is slidably arranged at 224 on a rod 222 carrying the cup 219, and said bracket is provided at its upper end with a rotatably mounted counter head 220 which bears with its preferably slightly tapered face against the head of the package 12f. The necessary pressure of said head against the package is produced by the bracket 221 being fixed to a rack 225 with which meshes a pinion 226, which is loose on shaft 39, and is connected by a chain 248 to a weight 247. The rack 225 also serves to prevent the cup 219 from tilting on its supporting rod 222, said bracket being a sliding fit on the rack. The yarn guide 14f is mounted on a shaft 138 common to a group of spindles, as in the construction shown in Fig. 7. Said yarn guide has a rocking traverse only, and is resiliently connected to the rock shaft 138 by the bracket 139, counter bracket 140 and spring 35. The following device is provided to enable the yarn to be pieced together after breakage of the yarn: The spindle 4f is slidably mounted in a sleeve 212 which is revolvable in the frame members 5f, 5a. The left hand end of said spindle is engaged by a cap 250 carried by an arm 218. The latter is fixed to a rod 213 slidably mounted in the frame members 5f, 5a and provided with a handle 216 and with notches 217 with which is adapted to engage a pawl 214 pivoted at 215 to member 5f, so that said rod may be locked in two alternative positions. In case of yarn breakage or the supply of yarn failing, the detector 27f, 29f, pivoted at 28f, swings rearwards and by means of its lower short arm 702 disengages the spindle clutch 124f, 125f, so that the spindle 4f and consequently the cop 12f also stops. The pawl 214 is then lifted by hand and the rod 213 is pulled out until the pawl drops into the rear notch 217 in rod 213. This results in the cop being pushed out of the cup 219 so that the end of the thread on the last winding can be readily seized and pieced up. The cop with its pressure applying device 220, 221, 225 is thereupon returned to its original position (Fig. 14) by the reverse manipulation of rod 213. The resultant tensioning of the tied yarn causes the detector 27f, 29f to return to operative position, the clutch 124f, 125f to be engaged again by its spring 127 and the spindle 4f to rotate again.

The automatic doffing and donning operation is started and operates as follows:

A group of cams 228, 238 revolubly mounted on a rotating shaft 39 can be clutched to the shaft by means of a clutch shown in detail in Figs. 15 and 16. The hub of cam 238 has a recess 703 in which is held a sliding dog 245. A spring 246 within the recess 703 urges the dog 245 toward a flange 240 fixed on shaft 39, the flange having a notch 704 to receive the end of the dog for clutching the parts together. During the winding operation the dog is held retracted from notch 204 by the wedge shaped arm 241 of a bell crank lever 241, 242 pivotally mounted on the frame 236. The arm 241 releases the dog 245 when the cop attains its prescribed length, through the action of a dog 243 on the end of a rod 244 fixed to bracket 224. During the revolution of the cams which follows, bracket 224 is moved outward to such an extent, as will presently be described, that dog 243 passes over arm 242 and arm 241 drops back into position to release clutch dog 245 after one revolution of the cams.

A lever 231, 232 pivoted at 233 to the cam 228 is normally held by a spiral spring with its arm 232 against one end of a cam 235 which is always stationary and is arranged on an extension of the fixed hub 237 of the frame member 236. When the donning and doffing device is rendered operative as above described the cam 228 also rotates. The lever 231, 232 immediately moves away from the fixed cam 235 and the arm 231 of said lever engages a projection 230 in the crown of gear 226. This couples the gear 226 to the drive of shaft 39, so that, in counteraction to the weight 247 the device 220, 221, 225 is moved forward by the drive of shaft 39, and the cop 12f is released by the head 220, the part 224 of bracket 221 engaging the collar 223 on shaft 222. The rack 225 continues its outward movement and the conical cup 219 fixed to bar 222 also moves outwards with the cop 12f until the latter is clear of the spindle 4f, whereupon the cop drops down the chute 103 into the cop collecting box 104.

The beginning of the yarn for the new cop is secured in the following manner: after the cone cup 219 with cop 12f during the above described doffing, reaches a position where it is clear of the range of the traverse motion of the yarn guide, the spindle 4f makes a few more revolutions and the yarn guide a corresponding number of traverse movements, so that the first layers of yarn for the succeeding cop are wound on the bare spindle. During the subsequent continued movement of the parts 220, 221, 222 and of the cup 219 with cop 12f, the yarn guide 14f is stopped until the cup 219 again reaches its initial position, this being effected by an arm 227 on the bracket 139 engaging with its free end the circular part of the periphery of cam 228, so that said arm is prevented from rocking while in engagement with this part of the cam 228. The depression 229 in cam 228 allows the yarn guide to execute its swinging movement during the winding operation, and is long enough to permit this swinging movement to continue for a short time after the doffing operation has started. At the moment the yarn guide stops the spindle clutch 124f, 125f is disengaged, and the spindle consequently stopped, by a lever 128, 129 which is pivoted at 130 to an arm on the frame member 5a and coacts with the cam 238. At the end of the donning and doffing operation all the parts above mentioned return to their initial position, the dog 231, 232 being disengaged from gear 226 by cam 235 as the cams complete their revolution, so that the gear 226 is released to the action of weight 247 and restores the bracket 221 to its extreme left position.

The above described novel method whereby the first windings of the yarn for the new cop also serve to secure the start of the thread to the naked spindle or vice versa, such windings being absolutely necessary for the doffing and donning operation, and such first windings being also used as the first layers of yarn for the new cop, renders unnecessary the provision of any special operation for such securing of the start of the yarn, and it also prevents all waste of yarn.

Where it is only desired to produce tubeless cops in this kind of machine, i. e. cops devoid of a cop tube, the hereinbefore described device for delivering new cop tubes during the donning and doffing is, of course, not required. Where, however, short tubes which only reach as far as the first layers of yarn are also used, the same or a similar automatically acting tube delivery device as hereinbefore described may be provided.

If the cop tube delivery device according to the invention is also to be used for cop winding machines with spindles which project right through the cops, and also for cop tubes which pass right through the cops, means are provided for imparting to the delivery container or to the cop spindle additional movements coaxial with the spindle, for the purpose of automatically pushing the cop tube onto the spindle, such movements being also produced by suitable actuating means.

In the constructions herebefore described there are several sources of power for each group of spindles and they are common to all the winding points. The power may, however, be taken off at one place for each winding point, either from a special shaft or there may be a separate motor for each winding point, or again, the drive may be taken from one of the common shafts as in the following case.

In the device shown in Fig. 17 for producing tubeless cops 12g the spindle 4g is driven from the main shaft 1 by bevel wheels 705, 706, the latter being integral with hub 707 of one-half 124g of a clutch 124g, 125g. The wheel 706, 707, 124g is held in position by collars 211. Clutch member 125g is splined to shaft 4g and is acted upon by a clutch spring 127. The cop 12g is engaged at opposite ends by the cone cup 219 and head 220, which may run on ball bearings. The yarn passes from the guide roller 29 and yarn guide 14g to the cop. The yarn guide 14g is fixed to the bracket 139g. The finished cops are discharged into the chute 103, 104 from which they may be carried away by an endless conveyor belt 105.

Whereas, in the previous constructions a common shaft for initiating the operations at the several winding points is provided, in the present construction there is a shaft 282 for each winding point. The shafts 282 are mounted on cross bars 818 of a frame 236g carried by beams 38g and 54g, each shaft being fixed to its cross bar by a nut 819 screwed onto the threaded end 820 of the shaft. Journalled on each shaft 282 are three rotary members, a gear 281, a cam unit 821, and a gear 226, all being held in place by a collar 822 secured to the shaft by a set screw 823. The gear 281 meshes with a gear 280 fixed to a sprocket 278 rotatably mounted on a stub shaft 279. A chain 277 connects sprocket 278 with a sprocket 276 mounted on stub axle 275. A gear 274 fixed to sprocket 276 meshes with a gear 273 fixed to drive shaft 1, completing driving connections for constantly rotating gear 281. Guided in a recess of the cam unit 821 is a sliding dog 245 urged to the left by a spring 246. The gear 281 has a recess 704 adapted to receive the end of the dog 245 when it moves to the left. The dog is held to the right during the winding operation by an arm 241g of a bell crank lever pivoted at 229 on the frame 236g. The other arm 242g of the bell crank lever cooperates with a dog 243 fixed upon a rod 244, which is secured to a boss 809 on post 221 and guided in a bearing 830. The yarn guide bracket 139g is mounted on an arm 284 pivoted at 283, and connected by connecting rod 285 to a bell crank lever 287 at 286. The lever 287 is pivoted at 288 and its arm 289 is held by a spring 291 in contact with a cam 290 on shaft 1.

This machine for the production of tubeless cops effects entirely automatically the winding of cross wound cops or the like up to the delivery of the finished cops. The beginning of the thread is wound on the spindle 4g by hand for the first cop to be produced. The winding of the cop is then commenced by co-operation of the cup 219 and yarn guide 14g the face of the counter head 220 being at first inside the cup cone 219. The head 220 is then gradually moved axially by the building up of the yarn. As soon as the cop 12 has attained its full length the rod 244, by means of its dog 243, rocks the lever 241g, 242g so that the latter is disengaged from the dog 245, which results in the coupling of the cam unit 821 to the constantly rotating gear 281. Soon after the cam unit begins to rotate, its cam 238 engages the end of an arm 129 of a bell crank lever rockably supported on a stationary pivot 130. As the bell crank lever is rocked by cam 238 its arm 128 engages the coupling half 125g and disconnects the spindle 4g from its drive. The dog 245 has a finger 231 adapted to engage a lug 230 of gear wheel 226 when the dog moves to the left. In this way the gear 226 is also coupled to the constantly rotating gear 281. The rack 225 meshing with the gear 226 is thus driven to the right, carrying with it the post 221 and counterhead 220. When the sleeve 224 strikes collar 223 on rod 222, the latter is also carried to the right and strips off the cop from the spindle. The cop drops into the chute 103. Before the cop is quite released the spindle 4g makes a few more revolutions, thus winding a few turns of yarn onto the bare spindle. The length of thread between the turns of thread on the spindle and the dropped cop is severed by the shears 109, 110. The heads 220 and 219 are then returned to their original position by the weight 247 and cord 248, and the building up of a fresh cop commences again quite automatically without the requirement of any manual operation.

In the case of yarn breakage, the lever 27 pivoted at 28, swings back, engages with its lower end the flange of the clutch member 125g and thus disengages the clutch. Where a machine comprises a plurality of adjacent winding points the latter operate entirely independently of each other.

Referring to the machine shown in Figs. 19, 20 and 21 for winding cop tubes, separate shafts 282h are driven by a worm 300 and worm wheel 301 from the spindle shaft 4h. The worm wheel 301 is rigidly mounted on a shaft 302 to which is also fixed a cam 303 and a gear wheel 304 which meshes with a gear wheel 305 fixedly mounted on the shaft 282h. The shaft 282h also has revolubly mounted thereon a cam unit comprising cams 41h, 44h, 181h, 182h. The cam unit, when in operation, is driven by frictional contact of the end face of cam 41h against a friction face 935 on gear 305. A spring 902, backed against a collar 900 fixed to shaft 282h by a pin 901, presses the cam unit against the friction face 935. The cam unit is normally held against rotation by the engagement of one arm 62h of a pivoted bell crank lever with the nose of cam 41h. The building movement is imparted to the yarn guide 14h by a screw spindle 16h and the yarn guide is traversed by means of a three arm lever 306 the end 308 of one arm of which coacts with the cam 303, while the forked end 311 of another arm engages a roller 312 carried by the spindle 16h. The end 309 of the third arm of said lever normally swings free in the depressed part 310 in cam 182h.

The cop is built up in the following manner: The cop tube 13 is held between the heads 4a and 6. The yarn is then secured to the foot of the cop and passed through the yarn guide 14h. The spindle 4h is then driven from the main drive shaft by bevel wheels 2h, 3h and the formation of the cop is commenced. When cop 12h is fully wound the abutment 169h on the yarn guide 14h engages the collar 315 and moves the rod 314 axially, whereby the bell crank 61h is rocked so that its end 62h is lifted clear of the nose 41h and the cam unit begins to rotate. Then lever 317 is rocked by cam 181h and transmits its movement through connecting rod 316 to the lever 193, the forked end of which engages a pin 90 on the spring loaded plunger 7 of head 6, whereby the latter is retracted to allow the finished cop to drop into the discharge chute 103.

As the rod 316 moves, a cam member 318 provided with an inclined face and connected to lever 317 acts upon an arm 319 on a shaft 320 connected to a crank shaft 321, so that the latter is rotated. This causes a tail 322 on the yarn guide to be disengaged from a screw thread on one side of the spindle 16h, the yarn guide being then returned to its initial position by a spring 323. As the cop drops into the discharge chute the yarn is returned to its initial position due to the return movement of the yarn guide 14h and the yarn is positioned between the blades of the shears 109, 110 and in front of the driving head 4a on the spindle 4h. A tube magazine 92h is positioned at one side of the space between the spindle 4h and swivel cup 6. At the bottom of the tube magazine 92h is a transfer device 313 pivotally mounted by a shaft 903 upon the machine frame. The transfer device comprises a pair of rocking arms each provided at the top with a pivotally connected rest 904 normally positioned under the tubes in the magazine 92h and held up by a spring 905. The rocker arms are adapted to move the bottom tube held by the rest 904 into alignment with the spindle 4a and swivel cup 6 and are provided with trailing cam surfaces 906 to hold up the other tubes in the magazine during the swing of the rocker arms. For rocking the rocker arms there is fixed to the shaft 903 an arm 49h bearing a roller 114h which rests against cam 44h under the action of a spring 907. The cam 44h is coordinated with the cam 181h so as to rock the transfer device 313 during the interval between the retraction of swivel cup 6 and its return to engagement with the newly positioned cop tube 13h. When a fresh tube is donned the yarn is then automatically gripped between said driving head 4a and the foot of the cop tube, and the yarn between the point at which it is gripped and the finished cop is severed by the shears 109, 110, the arm 110 of which is actuated by the rocker arms of the transfer device 313. As the spindle continues to rotate the winding of the new tube starts automatically as described hereinbefore with reference to the previous constructions.

In all cases the assembly of cams may be so connected to their shaft that a dangerous stressing of the mechanism of the machine due to irregularities in operation may be avoided.

Figs. 22–24 show positive means for throwing out the drive for this purpose, as applied to a cam mechanism of the kind shown in Figs. 14–16. The disengagement of the cam gear from the shaft 39 is effected when the cop has attained the desired length, by the rocking of a bell crank dog 419 which releases the sliding dog 418 spring loaded at 417. The dog 418 then snaps into a recess in a disc 414 which is connected by one or more pins 415 to a disc 413 fast on the shaft 39. Should an overload occur due to an irregularity in the operation of a winding point, the pins 415 will shear, thus saving the mechanism of the machine from damage.

In the elastic coupling shown in Figs. 25, 26, and 26a there is a separate shaft 424 for each winding point for driving the assembly of cams, in lieu of a single common shaft 39, said shafts 424 being driven by an additional common shaft 422 through gear wheels 423, 425. The gear wheel 423 is pressed by a spring 428 against the disc 427 which rotates with shaft 422. In lieu of said spring 428 there may be provided a number of pins as above described adapted to shear on the occurrence of an overload. The other end of the spring 428 bears against a collar 426 held against sliding movement on shaft 422 by a pin and groove connection. The shafts 424 are detachably mounted upon longitudinal frame members of the machine by yokes 430. The assembly of cams and gear wheel 425 are held in position between the yoke arms 431 by collars 429. To effect relative adjustment of the cams the collars 429 are released. The shaft 424 is slid to the right so that the left hand collar 429 may be removed and the gear wheel 425 slid to the left to enable the interengaging toothed flanges 434 of cams 433 to be disengaged, whereupon the cams may be relatively adjusted by turning them, and the parts then reassembled.

A cop tube magazine adapted to receive several cop tubes for automatic delivery to each winding point is shown in the constructional example according to Figs. 1 to 4 at 92, and in Figs. 19 to 21 at 92h. Figs. 27 and 28 show diagrammatically means whereby the work of the operative may be substantially facilitated by automatically feeding tubes to the several winding points from a feed container by means of a conveyor. As shown in Fig. 27, the endless conveyor 251 is arranged above the tube magazine 92 on one side of a machine comprising a group of winding points. The holders 252, 253 for the tubes to be delivered are arranged on the conveyor at suitable distances apart and are advantageously fork shaped. One half 253 of each holder is fixed to the conveyor and the opposite half 252 is adapted to be swung open about a pin 263 carried by the conveyor. On each pin is a finger 252a which swings out with the holder half 252. A spiral spring 259 tends to hold the pivoted holder halves 252 in the closed position in which they embrace the cop tubes 13. Pivoted to the conveyor at 258 between the holders are specially shaped stop flaps. During their travel the tube holders 252 and 253 pass with their bottom edges over the flared tops 256 of the tube magazines 92 without touching them, whereas the fingers 252a on the pivoted halves of the holders 252, and the stop flaps 254 hang down lower, so that the fingers 252a during their travel strike against the tops 256 of the magazines and are thus constrained to swing the holder members 252 outwards, releasing the cop tube when it is over a magazine 92. To prevent the discharge of a tube which is released by its holder over a magazine which is already filled with cops, and to cause the released tube to be engaged again by the holder, the stop flaps 254 are arranged as follows. They are, as shown in Fig. 28, only of such a width as to safely hold the tubes resting on them. The top of each magazine 92 is provided on opposite sides with recesses or aperture 257 of such a width and depth as to allow the flaps while travelling to pass through said apertures, the flaps normally remaining in pendent position with their top extensions 255 resting against the conveyor. This normal position of a flap is shown at the right hand end magazine 92 in Fig. 27 and in this position the supporting face of a flap is at such an angle as to allow a tube to drop out of a holder 252, 253 into the magazine 92. Where, however, the magazine is full of tubes the flap will engage the top tube in the magazine and will be consequently rocked up to the position shown at the other two magazines in Fig. 27, and thus prevent a tube from dropping out of its holder. The rear wall of each magazine is cut away to allow the member 252a to pass.

The following description with reference to the constructions shown in Figs. 29–44 is directed in most cases to spindleless machines, for the sake of clearness, and the delivery of the tubes to one winding point only is shown. There may be any number of tube delivery devices arranged side by side and having a common drive, and they may be modified to suit different machines.

In Fig. 29, S designates the position of the cop in the machine; B the delivery position of the empty cop tubes and V the supply position, at which latter there is a stock of empty tubes as required for each winding point. The term empty tubes embraces all kinds of tubes adapted to carry the whole package or only a part thereof. The supply position V may be adjoining the winding position, V₁, laterally of the winding position, V₂ or in advance of this position, V₃, and it may be disposed above or below the horizontal plane passing through the axis of the cop on the spindle. The supply position may also be directly above or below the delivery position. It is essential that during the donning or doffing there should always be an empty tube at the delivery position B, i. e. in such a position relatively to the winding position S that it can be moved therefrom independently for each winding point and moved independently in co-operation with the doffing and donning to the corresponding winding point. Obviously, in the case of machines operating with spindles which pass right through the cops, the delivery position is preferably in front of the spindle and not at the side thereof.

Referring to Figs. 30 and 31, the cop spindle 4j is driven from the main shaft 1 by the bevel wheels 2j, 3j. Said spindle is not slidable in its bearing 5j and is provided with the usual centres comprising the spring loaded head 6j, 7j for the cop tube 510.

The yarn guide 14j is mounted on the sleeve 15j which in turn surrounds the longitudinally slidable screw spindle 16j carried by bearings 514 and 515. The spindle 16j carries its drive gear 516 which is in driving connection with the shaft 518, said driving connection being interrupted by the gear 519, 520 when the detector 27, 29 drops upon breakage of the thread, the gear 517 meshing with 516 being fixed to the ratchet wheel 519 and being driven by a friction disc on shaft 518. The bearings for shaft 518 and pivot 522 for the detent lever 520 are fixed by a cross member 521 to a longitudinal beam 710. The spindle 16j is slid by the rocker lever 526 on the rock shaft 525. Said lever 526 has a pin and slot connection 527, 528 with the end of the spindle 16j and is resiliently connected to the shaft 525 by a driver 529 fixed to shaft 525 and by spring 530, this connection being similar to the connection of lever 31 to shaft 30 according to Fig. 1 and being adapted to enable the donning and doffing operation at any spindle to be started independently of the winding operation of the other spindles. This starting of the doffing and donning operation is effected by the axial movement of spindle 16j causing an abutment 531 on the sleeve 15j of the yarn guide 14j to engage a slide rod 532 and thus actuating a bell crank lever 533, 534.

The lever 533, 534, lever 536, 537 and lever 87j, 88j are all rotatable about the same axis and are operated by a set of cams 535, 538, 550 mounted on shaft 39. Before the cams 538, 550 become operative to actuate their levers another cam 541 releases a rod 542 to the action of a spring 543. The rod 542 acts on a lever 544 which is pivoted to an arm 545 (Fig. 30) fixed to the frame of the machine, and the free end of said lever 544 coacts with a pin 908 on one arm of a three-armed lever 549, which is pivoted at 909 to an arm 548 of sleeve 15j and is urged by a spring 910 to engage the threads of screw spindle 16j. The rocking of lever 549 on its pivot is limited by abutment of its third arm 941 against sleeve 15j and when it reaches this position the yarn guide 14j is pushed back to its original position. At this moment the cam 550 actuates the lever 87j, 88j which pulls out the head 6j, 7j so that the cop is released and drops into the chute 103. The length of yarn behind the dropped cop places itself against the driving flange of the spindle 4j and is gripped between the said flange and the foot of the empty cop tube now to be brought into position for winding in a manner to be described, and a shears 547 severs the yarn from the cop. While the cop discharge is effected by the lever 87j, 88j, the spindle 16j is pushed back by lever 536, 537 actuated by cam 538.

The means for transferring the empty tube from the delivery position B to the winding point S (Fig. 29), and from the cop tube magazine V1, V2, or V3 to the delivery position is effected with the aid of additional cams on shaft 39.

In the construction shown in Figs. 30 and 31 the empty cop tube magazine 554 is fixed to a lever 556, 557 pivoted at 558. The lever 556, 557 is adapted to be rocked to the delivery position at any time between two doffing and donning operations by means of rod 560 and cam 561. The transfer arms 562 are provided with any suitable kind of grippers, jaws or the like, 911, to engage the tubes, and said arms are fixed to a shaft 564 to which lever 563 is also fixed. The arms 562 are adapted to be rocked from the delivery position to the winding position by the cam 566 which actuates the lever 563, the latter carrying a roller 565 which engages said cam 566.

When the magazine 554 reaches the position for delivery the bottom tube is forced into the grippers 911, being lifted from the pockets 555 and retained by the grippers when the magazine swings back. When a full cop is dropped owing to movement of the plunger 6j, 7j the transfer arms are rocked and the tube is made fast between the spindle flange 4a and swivel socket 6j, the transfer arms then moving back. The cam 566 is so adjusted in relation to the other cams that the grippers are moved away from the path of the empty tube before the yarn guide 14j has moved up to it.

Instead of rocking the container, the gripper arms 562k, as shown in Figs. 32 and 33, may be mounted on an axially sliding shaft 570. This shaft is keyed to an arm 563k actuated by a cam 571, so that the shaft can be rocked by arm 563k, at the same time being free to move longitudinally. Longitudinal movement is imparted to the shaft by means of a cam 576 acting upon a rack bar 574, which slides in bearing 575 and meshes with a pinion 573 fixed to a gear 572. The gear 572 meshes with annular teeth on shaft 570, which permit the shaft to rock while being moved axially.

Instead of mounting the magazine to rock, as in Figs. 30 and 31, there may be a stationary magazine 567, as shown in Figs. 32 and 33, combined with a transfer device having a movement parallel to the axis of the spindle in addition to its rocking movement. In these figures transfer arms 562k are fixed upon a shaft 570 mounted to slide axially in bearings 913, 914. The shaft 570 has a key 915 coacting with a corresponding keyway in hub 916 of lever arm 563k. At the end of lever arm 563k is a roller 565 which rides upon a cam 571 adapted to rock the transfer unit transversely to the spindle axis. Longitudinal movement is imparted to shaft 570 by means of a cam 576 acting upon a rack bar 574, which slides in bearing 515 and meshes with a pinion 573 fixed to a gear 572. The gear 512 meshes with annular teeth on shaft 570, which permit the shaft to rock while maintaining their mesh. The feed of the tubes from the magazine is controlled by an escapement mechanism comprising rocker arms 579 of inverted V form pivotally supported at 917 at the two ends of the magazine 567 and bearing detent plates 580 and 581 projecting into the magazine from opposite sides. The escapement device is held in the normal position shown in Fig. 33 by a spring 918, in which position the stack of tubes rests upon the detent plate 580. When the escapement device rocks to the left the detent plate 581 enters between the two lowest tubes of the stack, while the lowest tube is released from the magazine. The escapement device is actuated by bell crank lever 578 pivoted at 919 to the bottom of the magazine in position to be engaged by a cam arm 577 on the foremost transfer arm 562k. The transfer arms carry grippers 920 to hold the tubes. The normal position of the transfer device is shown in Figs. 32 and 33 in full lines. By suitable timing and construction of cams 571 and 576 the transfer device is moved through its sequence of operations. First it is shifted to the rear by axial movement of shaft 570, to the position shown in dot and dash lines in Fig. 32. As it reaches this position the cam 577 swings the escapement device 579 sufficiently to release the bottom tube into the grippers 920, following which the transfer device slides forward again and the detent device moves back to normal position, the stack of tubes slipping down until the bottom one rests upon the detent plate 580. Thereafter, during the interval between the release of the finished cop by retraction of swivel cup 6k and the return of the swivel cup to clamping position, the transfer arms are rocked to the dot and dash line position shown in Fig. 33, positioning the new tube between the spindle flange 4a and swivel cup 6k. The transfer arms are then rocked back to the normal position.

If the magazine or container is placed laterally in front of the winding point (Figs. 34, 35) the lateral spacing would have to be fairly large if the gripper arms had to be moved forwards. To avoid this a second gripper device is provided, which is pushed over the magazine 598 and conveys the top tube to the place of delivery. This device consists of a rod 582 having a nose 584 and moved in guides 583 by means of rods 585, 586. The floor 591 of the magazine is movable against the action of springs 592, or a weight or its equivalent, and its inlet opens against spring pressure. A chute 594 leads to a trough 912 between the arms 562m. The cam 590 actuating the rod 586 is adjusted in the same way as the cam actuating the rack 574 previously described.

The magazine can be filled by means of a clip 595 (Figs. 36 and 36a), which is charged by hand or mechanically. The clip has pivoted holders 596. If the tubes have grooves at the foot they may be carried by a plain holder bar from which they can be pushed by hand into the magazine.

If the machine has full length spindles, means are provided, for pushing the cops off the spindles, and pushing on the fresh tubes. Figs. 37 and 38) show an example. Instead of a separate transfer device, the magazine itself is mounted to rock into a position which brings the tube to be mounted into alignment with the spindle. The magazine 598p is mounted on an arm 599 extending upward from the hub of rock lever 563p. The rocking lever has a roller 565 bearing against a cam 566p. A push rod 582p, corresponding to the rod 582 in Fig. 34, has, in addition to a tube pusher 584p, a cop stripper 587. Longitudinal movement of the push rod 582p is provided for by a lever 585, slide bar 586, and cam 590, as in Fig. 34. The timing of the cams is such that the finished cop 12 is stripped off spindle 4p by stripper 587, while magazine 598p is in the position shown in Fig. 38. Thereafter the magazine is swung in so that its top tube 13 comes into alignment with spindle 4p, following which the push rod 582p moves back to the position shown in Fig. 37, driving the upper tube 13 over the spindle 4p. The magazine 598p is then swung back to the position of Fig. 38.

Figs. 39 and 40 illustrate an example in which the magazine is swung below a winding unit of the stub spindle and tail stock type. A magazine 598q, similar in general to the magazine 598p of Fig. 37, is mounted upon arms 599q secured to rock shaft 570q. An arm 563q also fixed to this shaft carries a roller 565 bearing against cam 566q. The magazine is positioned so that it can be rocked to bring the top tube 13 into alignment with spindle 4q and tail stock 8q. The magazine 598q has a lateral slot 597 through which the tube 13 escapes when it has been clamped by the spindle and tail stock and the magazine rocks back to the position shown in Fig. 40.

In the case of single spool machines or machines with adequately spaced spindles the magazine may of course be disposed laterally of the place of delivery, as shown in Figs. 41 and 42. These figures show a winding unit of the type comprising a stub spindle 4r rotatably mounted in a bearing 5r and driven by bevel gears 3r from a shaft 1, together with a tail stock 8r, which may be operated in the same manner as in Fig. 1. Below and beside the spindle and tail stock a frame 562r is rockably mounted by bearings 922 and 923 on a shaft 564r. The shaft 564r is rotatably mounted in bearings 924 and has fixed to it sprockets 606. At the upper end of the frame 562r is rotatably mounted a shaft 921 having fixed to it sprockets 606a. Chains 607 bearing tube holders 608 are trained over the sprockets. The shaft 564r is rotated intermittently by a star wheel 600 fixed to a shaft 712 and positioned so as to be engaged by a pin 711 on a cam 566r on shaft 39. The shafts 712 and 564r are interconnected by a worm drive 601, 602. The shaft 564r also has fixed to it a ratchet wheel 605 coacting with a pawl 604 pivotally mounted on the frame 562r. The pawl and ratchet wheel prevent the chain mechanism from moving backward. Tubes 13 are supplied to the tube holders 608 from magazine 598r. The frame 562r is positioned on its rocking support so that when rocked to the left (Fig. 42) the tube on the topmost tube holder 608 is brought into alignment with the spindle 4r. For rocking the frame there is provided on the bearing 922 a rigid arm 563r carrying a roller 565 which rests against the cam 566r. A spring 925 holds the frame normally in the position shown in Fig. 42. A chute to receive finished cops is formed by a stationary plate 926 and a movable plate 927 fixed to arms of the frame 562r. At the time the cops are doffed the plate 527 is in the position shown in Fig. 42. A plate 928 on the opposite side of the rocking frame guides the tubes to the top position, where they are delivered to the spindle. The feed of the chains 607 by the star wheel 600 is coordinated with the spacing of the tube holders 608 so that a full tube holder is brought to the top position at each feed movement. Instead of separate magazines there may in this case also be a tube conveyor supplying the whole machine with tubes, which are taken from it by the paternoster gears.

For the purposes of the invention it is immaterial whether the feed movement of the tubes or the magazines containing them is arcuate or rectilinear, and Figs. 43 and 44 show an arrangement enabling these movements to be interchanged. The gripper members 612 move on slide bars 610, and have pins 611 slidably engaged with the free ends of the arms 609. The control of the feed from the delivery position, by means of the cams on the shaft 39, is the same as previously described.

Figs. 45 to 47 show a device for arranging the tubes in proper order.

A conveyor belt is formed of links 613 bearing tube troughs 615. The conveyor belt is mounted to travel by intermittent movements between a stop plate 617 and the opening 618 of a chute 619. Means are provided to take a loose pile of tubes and arrange them and feed them forward individually to the chute 619, in synchronism with the intermittent movements of the the conveyor. A group of tubes is held in readiness by parallel guide plates 622 to be delivered one by one to the chute 619. The upper edges of the guide plates 622 are sufficiently inclined to cause the tubes to slide forward toward the chute 619. An escapement device 621 is mounted on a rocking lever 620 adapted to be actuated by pins 614 on the conveyor links, each pin, in passing, rocking the lever 620 to release the lowermost tube on the guide plates 22 into the chute 619, which turns the tube and delivers it to the trough 615 which is at that time opposite the opening 618 of the chute.

A miscellaneous pile of tubes is held in a shaker box 627, which is joggled by a cam device 628 of familiar construction. The joggling movement of the box tends to separate tubes from the pile and they mostly circle into the position of the tube shown at the right end of the box 627, due to their tapered shape, and thus drop out of the box foot end first. The tubes drop between guide plates 625, which feed them to a pair of spaced conveyor belts 624. The smaller ends of the tubes pass between the conveyor belts and the tubes are held by their larger ends in the position shown. The conveyor belts carry the tubes under a stripper bar 626, which prevents more than one tube from passing at a time. The tubes are delivered by the conveyor belts over a small stationary slotted chute 930 to a tilting slotted chute 623, which is aligned with the inclined guide plates 622. The tilting chute 623 is counterweighted by the weight arm 931 so as to be capable of supporting only one tube at a time. If more than one tube arrives on the tilting chute, the chute tilts up and allows one of the tubes to drop into a chute 631, 630, through which it passes to a conveyor 629. The excess tubes are delivered by the conveyor 629 to a chute 632, which returns them to the box 627.

What we claim as our invention and desire to secure by Letters Patent of the United States is:

1. In a yarn winding frame; a plurality of winding heads comprising rotatable supports uppon which to wind the yarn; means for rotating said supports; a yarn guide adjacent each support through which the yarns are supplied to the respective supports; means for relatively oscillating said yarn guides and supports to cross wind the yarns; builder means for relatively shifting said yarn guides and the packages being wound, progressively in one direction; means for individually doffing the completed wound packages; driving means common to all said winding heads; individual driving devices for each winding head mounted on separate shafts, for throwing said doffing means into operation; and means acting independently at each winding head in dependence upon the growth of the wound package at said winding head to a predetermined length, for coupling the respective individual driving devices to said common driving means.

2. In a yarn winding frame; a plurality of winding heads comprising rotatable supports upon which to wind the yarn, means for rotating said supports; a yarn guide adjacent each support through which the yarns are supplied to the respective supports; means for relatively oscillating said yarn guides and supports to cross wind the yarns; builder means for relatively shifting said yarn guides and the packages being wound, progressively in one direction; means for individually doffing the completed wound packages; driving means common to all said winding heads; individual driving devices for each winding head mounted on separate shafts, for throwing said doffing means into operation; and means individual to each winding head for coupling the respective individual driving devices to said common driving means, said last means comprising a part travelling in coordination with the growth of the respective yarn body and a stop protruding into the path of said part.

3. In a yarn winding frame; a plurality of winding heads comprising rotatable supports upon which to wind the yarn; means for rotating said supports; a yarn guide adjacent each support through which the yarns are supplied to the respective supports; means for relatively oscillating said yarn guides and supports to cross wind the yarns; builder means for shifting said yarn guides with reference to the packages being wound, progressively in one direction; means for individually doffing the completed wound packages; driving means common to all said winding heads; individual driving devices for each winding head mounted on separate shafts, for throwing said doffing means into operation; and means individual to each winding head for coupling the respective individual driving devices to said common driving means, said last means comprising a stop protruding into the path of the respective yarn guide.

4. In a machine for winding cops upon tubes; a plurality of winding heads comprising spindles for rotating the tubes; a yarn guide adjacent each spindle through which the yarns are supplied to the respective tubes; means for relatively oscillating said yarn guides and spindles to cross wind the yarns; means for relatively moving said yarn guides and spindles progressively in one direction to build the cops along the tubes; means for individually doffing the completed cops from said spindles; means for individually supplying said spindles with new tubes; driving means common to all said winding heads; individual driving devices for each winding head mounted on separate shafts, for throwing into operation first said doffing means and then said tube supplying means; and means acting independently at each winding head in dependence upon the growth of the wound package at said winding head to a predetermined length, for coupling the respective individual driving devices to said common driving means.

5. In a machine for winding cops upon tubes; a spindle for rotating the tube; a yarn guide; means for relatively oscillating said yarn guide and spindle to cross wind the yarn; means for relatively moving said spindle and yarn guide progressively in one direction to build the cop along said tube; means for doffing the completed cop from said spindle; means for restoring the initial relative position of said yarn guide and spindle; normally inactive driving means adapted to throw said doffing means and said restoring means into operation; means acting in dependence upon the growth of the cop to a predetermined length, for initiating an operation of said driving means; and means operated in conjunction with said driving means for feeding an empty tube to said spindle after the doffing operation.

6. In a yarn winding frame; a rotatable support upon which to wind the yarn; means for rotating said support; a yarn guide through which yarn is supplied to said support; means for relatively oscillating said yarn guide and said support to cross wind the yarn; builder means for relatively shifting said yarn guide and the package being wound, progressively in one direction; means acting in dependence upon the growth of the wound package to a predetermined length, for doffing the completed package; and means controlled in conjunction with said last mentioned means, for interrupting the relative oscillation of said yarn guide and said support.

7. In a machine for winding cops upon tubes; a spindle for rotating the tube; a yarn guide; means for relatively oscillating said yarn guide and spindle to cross wind the yarn; means for relatively moving said spindle and yarn guide progressively in one direction to build the cop along said tube; means for doffing the completed cop from said spindle; normally inactive driving means adapted to throw said doffing means into operation; means acting in dependence upon the growth of the cop to a predetermined length, for initiating an operation of said driving means; a tube magazine adjacent said spindle; and means operated in conjunction with said driving means for feeding an empty tube from said magazine to said spindle after the doffing operation.

8. In a yarn winding frame for winding yarn on tubes; a spindle member for rotating the tube; a yarn guide member; means for relatively oscillating said members for cross winding the yarn; a screw shaft; means for rotating said screw shaft; means connected with one of said members having a device engaging the threads of said screw shaft so as to move said latter member progressively in one direction with respect to the other member, whereby to build the wound body along the tube; means for restoring said progressively moving member to starting position, including means for releasing said device from said screw shaft; driving means for said last means; means for doffing the wound package from said spindle; and means acting in dependence upon the growth of the wound package to a predetermined length, for releasing an operation of said driving means and said doffing means.

9. In a yarn winding frame, a support mounted for sliding motion; a spindle and a tail stock on said support, said tail stock having a yielding swivel to clamp a tube against said spindle; a yarn guide; builder means for causing a progressive relative movement in one direction between said spindle and said yarn guide; traverse means for reciprocating said support; means acting in dependence upon the growth of the yarn package on the tube to a predetermined point, for withdrawing said swivel to release the completed package; and means operating in conjunction with said last means for interrupting the reciprocation of said support.

10. In a yarn winding frame, a support mounted for sliding motion; a spindle and a tail stock on said support, said tail stock having a yielding swivel to clamp a tube against said spindle; a yarn guide; builder means for causing a progressive relative movement in one direction between said spindle and said yarn guide; traverse means comprising a yielding actuator for reciprocating said support; means acting in dependence upon the growth of the yarn package on the tube to a predetermined point, for withdrawing said swivel to release the completed package; and means operating in conjunction with said last means for holding said support stationary against the influence of said yielding actuator.

11. In a yarn winding frame, a support mounted for sliding motion; a spindle and a tail stock on said support, said tail stock having a yielding swivel to clamp a tube against said spindle; a yarn guide; builder means for causing a progressive relative movement in one direction between said spindle and said yarn guide; traverse means comprising a yielding actuator for reciprocating said support; means acting in dependence upon the growth of the yarn package on the tube to a predetermined point, for withdrawing said swivel to release the completed package; means for holding said support stationary against the influence of said yielding actuator; said last means comprising a hook to engage said support and means acting in conjunction with said package releasing means for causing the movement of said hook to operative position.

12. In a yarn winding frame, a support for a tube to be wound; a yarn guide beside said support; traverse means for causing a relative oscillation between said support and said guide; builder means for causing a progressive relative motion in one direction between said support and said guide; means acting in dependence upon the growth of the wound package to a predetermined length, for doffing the latter from said support; and means operating in conjunction with said last means for stopping the relative oscillation of said support and said guide by said traverse means.

13. In a yarn winding frame, a support for a tube to be wound; a yarn guide beside said support; traverse means for causing a relative oscillation between said support and said guide; builder means for causing a progressive relative motion in one direction between said support and said guide; means acting in dependence upon the growth of the wound package to a predetermined length, for doffing the latter from said support; means operating in conjunction with said last means for stopping the relative oscillation of said support and said guide by said traverse means; and means also operating in conjunction with said last means for feeding a new tube to said support.

14. In a yarn winding frame, a spindle for rotating a tube; a screw shaft paralleling the axis of said spindle; a yarn guide having a device engaging the screw threads of said shaft; means for rotating said screw shaft to advance the yarn guide progressively along the tube; means for reciprocating said screw shaft to traverse said yarn guide; and means acting in dependence upon the growth of the wound package on the tube to a predetermined length, for doffing the wound package from said spindle.

15. In a yarn winding frame, a spindle for rotating a tube; a screw shaft paralleling the axis of said spindle; a yarn guide having a device engaging the screw threads of said shaft; means for rotating said screw shaft to advance the yarn guide progressively along the tube; means comprising a yielding actuator for reciprocating said screw shaft to traverse said yarn guide, means acting in dependence upon the growth of the wound package on the tube to a predetermined length for doffing the wound package from said spindle, and means operating in conjunction with said last means for holding said screw shaft stationary against the influence of said yielding actuator.

16. In a yarn winding frame for winding yarn on tubes; a spindle member for supporting the tube; a yarn guide member; means for relatively oscillating said members for cross winding the yarn; a screw shaft; means for rotating the same; means connected with one of said members having a device engaging the threads of said shaft so as to move said latter member progressively in one direction with respect to the other member, whereby to build the wound body along the tube; a thread detector, and means actuated thereby for interrupting the rotation of said screw shaft; means for restoring said progressively moving member to starting position, including means for releasing said device from said screw shaft; driving means for said last means; means acting in dependence upon the growth of the wound package to a predetermined length for starting an operation of said driving means; and means operating in conjunction with said driving means for doffing the wound package from said spindle.

17. In a yarn winding frame; a rotatable support upon which to wind the yarn; means for rotating said support; a yarn guide through which yarn is supplied to said support; means for relatively oscillating said yarn guide and said support to cross wind the yarn; builder means for relatively shifting said yarn guide and the package being wound, progressively in one direction; means for doffing the completed package; and means adapted to be contacted by the nose of the package when it builds up to a predetermined point, for setting said doffing means in operation.

18. In a yarn winding frame; a rotatable support upon which to wind the yarn; means for rotating said support; a yarn guide through which yarn is supplied to said support; means for relatively oscillating said yarn guide and said support to cross wind the yarn; builder means for relatively shifting said yarn guide and the package being wound, progressively in one direction; means for doffing the completed package; means adapted to be contacted by the nose of the package when it builds up to a predetermined point, for setting said doffing means in operation, and means adapted to act in conjunction with said doffing means for restoring the relative starting position of said yarn guide and said support.

19. In a yarn winding frame; a rotatable support upon which to wind the yarn; means for rotating said support; a yarn guide through which yarn is supplied to said support; means for relatively oscillating said yarn guide and said support to cross wind the yarn; a screw threaded shaft parallel to the axis of said support; a feeler wheel contacting the nose of the growing package and cooperating with said threaded shaft to advance said yarn guide along said support; yielding means urging said yarn guide toward starting position, means acting in dependence upon the growth of the wound package to a predetermined length, for doffing the completed package; and means operating in conjunction with said doffing means for releasing said yarn guide to be restored to starting position by said yielding means.

20. In a machine for winding cops upon tubes; a spindle for rotating the tube; a yarn guide; means for relatively oscillating said yarn guide and spindle to cross wind the yarn; means for relatively moving said spindle and yarn guide progressively in one direction to build the cop along said tube; means for doffing the completed cop from said spindle; means for restoring the initial relative position of said yarn guide and said spindle; means for feeding an empty tube to said spindle; a group of cams acting as a unit and controlling said doffing means, said restoring means, and said feeding means; driving means for said cams; and means acting in dependence upon the growth of the package of yarn on the tube to a predetermined length for causing said cams to be coupled to said driving means.

21. In a cop winding machine, a plurality of winding stations, each comprising a rotatable supporting device adapted to hold a tube upon which to wind the yarn, and an appurtenant yarn guiding device; means for fixing yarn with respect to each tube; means for imparting a back and forth movement to one of said devices of each station with respect to the other, to traverse the yarn; builder means acting upon one of said devices of each winding station, to advance the same progressively in a direction parallel to the axis of rotation of said supporting device; mechanisms at each winding station for doffing the cop and for supplying a new tube to the supporting device; normally inoperative, independently operable actuating means at each station for operating said mechanisms; a common drive for all of said actuating means; means acting independently at each winding station, in dependence upon the growth of the cop at said station to a predetermined length, to couple the appurtenant actuating means to said common drive; means at each winding station for conveying the trailing end of yarn from the doffed cop to the fixing means; means for severing the yarn between the fixing means and the doffed cop; and means for restoring the progressively advanced one of said devices to starting position.

22. In a cop winding machine, a plurality of winding stations, each comprising a rotatable supporting device adapted to hold a tube upon which to wind the yarn, and an appurtenant yarn guiding device; means for fixing yarn with respect to each tube; means for imparting a back and forth movement to one of said devices of each station with respect to the other, to traverse the yarn; builder means acting upon one of said devices of each winding station, to advance the same progressively in a direction parallel to the axis of rotation of said supporting device; said builder means comprising a screw and a releasable dog coacting therewith; mechanisms at each winding station for doffing the cop, for releasing the dog of the builder means and restoring the progressively advanced one of said devices to starting position, and for supplying a new tube to the supporting device; normally inoperative, independently operable actuating means at each station for operating said mechanisms; a common drive for all of said actuating means; means acting independently at each winding station, in dependence upon the growth of the cop at said station to a predetermined length, to couple the appurtenant actuating means to said common drive; means at each winding station for conveying the trailing end of yarn from the doffed cop to the fixing means; and means for severing the yarn between the fixing means and the doffed cop.

23. In a cop winding machine, a plurality of winding stations, each comprising a rotatable supporting device adapted to hold a tube upon which to wind the yarn, and an appurtenant yarn guiding device; means for fixing yarn with respect to each tube; means for imparting a back and forth movement to one of said devices of each station with respect to the other, to traverse the yarn; builder means acting upon one of said devices of each winding station, to advance the same progressively in a direction parallel to the axis of rotation of said supporting device; said builder means comprising a screw and a releasable dog coacting therewith; means individual to each winding station yieldingly resisting the progressive movement of the advanced device; mechanisms at each winding station for doffing the cop, for supplying a new tube to the supporting device, and for releasing the dog of the builder means, thereby allowing the advanced device to return to starting position under the influence of said yielding means, normally inoperative, independently operable actuating means at each station for operating said mechanisms; a common drive for all of said actuating means; means acting independently at each winding station, in dependence upon the growth of the cop at said station to a predetermined length, to couple the appurtenant actuating means to said common drive; means at each winding station for conveying the trailing end of yarn from the doffer cop to the fixing means; and means for severing the yarn between the fixing means and the doffed cop.

24. In a cop winding machine, a plurality of winding stations, each comprising a rotatable supporting device adapted to hold a tube upon which to wind the yarn, and an appurtenant yarn guiding device; means for fixing yarn with respect to each tube; means for imparting a back and forth movement to one of said devices of each station with respect to the other, to traverse the yarn; builder means acting upon one of said devices of each winding station, to advance the same progressively in a direction parallel to the axis of rotation of said supporting device; mechanisms at each winding station for doffing the cop and for supplying a new tube to the supporting device; normally inoperative, independently operable actuating means at each station for operating said mechanisms; a common drive for all of said actuating means; means acting independently at each winding station, in dependence upon the growth of the cop at said station to a predetermined length, to couple the appurtenant actuating means to said common drive; means at each winding station for conveying the doffed cop to a position such that the trailing yarn therefrom is carried to the fixing means; means for severing the yarn between the fixing means and the doffed cop; and means for restoring the progressively advanced one of said devices to starting position.

25. In a cop winding machine, a plurality of winding stations, each comprising a rotatable supporting device adapted to hold a tube upon which to wind the yarn, and an appurtenant yarn guiding device; means for fixing yarn with respect to each tube; means for imparting a back and forth movement to one of said devices of each station with respect to the other, to traverse the yarn; building means acting upon one of said devices of each winding station, to advance the same progressively in a direction parallel to the axis of rotation of said supporting device; mechanisms at each winding station for doffing the cop, for interrupting the operation of the traversing means, and for supplying a new tube to the supporting device; normally inoperative, independently operable actuating means at each station for operating said mechanisms; a common drive for all of said actuating means; means acting independently at each winding station, in dependence upon the growth of the cop at said station to a predetermined length, to couple the appurtenant actuating means to said common drive; means at each winding station for conveying the trailing end of yarn from the doffed cop to the fixing means; means for severing the yarn between the fixing means and the doffed cop; and means for restoring the progressively advanced one of said devices to starting position.

26. In a machine for winding yarn on a tube; a spindle member for rotating the tube; a yarn guide member; means for relatively oscillating said members for cross winding the yarn; builder means for shifting one of said members progressively in one direction in relation to the other member, to build the body of yarn axially of the tube; means for doffing the completed package; means for supplying a new tube to said spindle member; and means controlled by a part moving in conjunction with that one of said members which moves progressively, for starting an operation of said doffing means and said new tube supplying means.

WILHELM REINERS.
GUSTAV KAHLISCH.